US010093269B2

(12) United States Patent
Kobayashi et al.

(10) Patent No.: US 10,093,269 B2
(45) Date of Patent: Oct. 9, 2018

(54) PASSENGER PROTECTING DEVICE FOR VEHICLE

(71) Applicant: TOYOTA JIDOSHA KABUSHIKI KAISHA, Toyota-shi, Aichi-ken (JP)

(72) Inventors: Ippei Kobayashi, Okazaki (JP); Mitsuyoshi Ohno, Miyoshi (JP); Atsushi Nakashima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 6 days.

(21) Appl. No.: 15/208,224

(22) Filed: Jul. 12, 2016

(65) Prior Publication Data

US 2017/0028960 A1 Feb. 2, 2017

(30) Foreign Application Priority Data

Jul. 30, 2015 (JP) ................................ 2015-150925

(51) Int. Cl.

| | |
|---|---|
| ***B60R 21/231*** | (2011.01) |
| ***B60R 21/207*** | (2006.01) |
| ***B60R 21/233*** | (2006.01) |
| ***B60R 21/2338*** | (2011.01) |
| ***B60N 2/42*** | (2006.01) |

(Continued)

(52) U.S. Cl.

CPC .............. *B60R 21/231* (2013.01); *B60N 2/42* (2013.01); *B60N 2/42763* (2013.01); *B60R 21/16* (2013.01); *B60R 21/207* (2013.01); *B60R 21/233* (2013.01); *B60R 21/2338* (2013.01); *B60R 21/23138* (2013.01); *B60R 2021/0055* (2013.01); *B60R 2021/23146* (2013.01);

(Continued)

(58) Field of Classification Search

CPC ... B60R 21/231; B60R 21/207; B60R 21/233; B60R 21/23138; B60R 21/2338; B60R 2021/23146; B60R 2021/23324; B60R 2021/23382; B60N 2/42718; B60N 2/42763

USPC ............. 280/730.2, 730.1, 729, 743.1, 743.2

See application file for complete search history.

(56) References Cited

U.S. PATENT DOCUMENTS

2014/0001799 A1 1/2014 Kalisz et al.
2014/0346819 A1* 11/2014 Fukawatase ......... B60N 2/4221 297/180.1

(Continued)

FOREIGN PATENT DOCUMENTS

CN 103507744 A 1/2014
JP 2002-145003 A 5/2002

(Continued)

*Primary Examiner* — Keith J Frisby

(74) *Attorney, Agent, or Firm* — Oliff PLC

(57) ABSTRACT

A passenger protecting device 10 for a vehicle has: a side airbag portion 20 that is accommodated at an interior of a side support portion 14B, and that, by receiving a supply of gas and inflating at a time of an oblique side collision of a vehicle, causes the side support portion 14B to bulge-out toward the seat upper side; and a seat cushion airbag portion 22 that is accommodated at an interior of the seat portion 14A, and that, by receiving a supply of gas and inflating at a time of an oblique side collision of the vehicle, causes the seat portion 14A to bulge-out toward the seat upper side and raises the femoral region D of the passenger P, and whose inflation is completed later than the side airbag portion 20.

12 Claims, 13 Drawing Sheets

(51) Int. Cl.

| | |
|---|---|
| ***B60N 2/427*** | (2006.01) |
| ***B60R 21/16*** | (2006.01) |
| *B60R 21/00* | (2006.01) |

(52) U.S. Cl.

CPC ............... *B60R 2021/23324* (2013.01); *B60R 2021/23382* (2013.01)

(56) References Cited

U.S. PATENT DOCUMENTS

| | | | |
|---|---|---|---|
| 2015/0076801 | A1 | 3/2015 | Fujiwara |
| 2015/0367806 | A1 | 12/2015 | Fujiwara |

FOREIGN PATENT DOCUMENTS

| | | | |
|---|---|---|---|
| JP | 2007-091083 | A | 4/2007 |
| JP | 2008-037276 | A | 2/2008 |
| JP | 2008-094235 | A | 4/2008 |
| JP | 2014-141159 | A | 8/2014 |
| JP | 2015-048054 | A | 3/2015 |
| JP | 2015-058823 | A | 3/2015 |
| WO | WO 2013/094027 | A1 * | 6/2013 |

* cited by examiner

PASSENGER PROTECTING DEVICE FOR VEHICLE

CROSS-REFERENCE TO RELATED APPLICATION

This application claims priority under 35 USC 119 from Japanese Patent Application No. 2015-150925 filed Jul. 30, 2015, the disclosure of which is incorporated by reference herein.

BACKGROUND

Technical Field

The present invention relates to a passenger protecting device for a vehicle.

Related Art

Japanese Patent Application Laid-Open (JP-A) No. 2002-145003 discloses an airbag device in which a bag portion for a seat, that by inflating raises the front portion side of a seat portion of a seat cushion, and a bag portion for a side, that by inflating protrudes-out toward the seat upper side from the seat transverse direction outer side of the seat portion and covers the seat transverse direction outer side of a passenger, are inflated simultaneously. JP-A No. 2015-048054 discloses an airbag that includes a main chamber, that is accommodated within the seat surface portion of a seat cushion and that is sectioned into left and right portions at a central portion in the seat transverse direction, and an auxiliary chamber that communicates with the main chamber and that is provided within a side support portion at the seat transverse direction outer side of the seat surface portion.

In the techniques disclosed in the above-described patent documents, at the time of an oblique side collision of the vehicle, the airbag within the seat portion (the seat cushion airbag) inflates and causes the seat portion to bulge-out toward the seat upper side, and the femoral region of the passenger is thereby raised. Due thereto, the occurrence of the so-called submarine phenomenon, in which the passenger becomes a posture of burrowing-in toward the seat front side, is prevented or suppressed. On the other hand, due to the airbag at the seat transverse direction outer side of the passenger (the side airbag) inflating, the lumbar region and the femoral region of the passenger are protected.

SUMMARY

However, in the techniques disclosed in the above-described patent documents, the side airbag and the seat cushion airbag inflate simultaneously. Therefore, there is the concern that the femoral region of the passenger, that has been raised by the seat cushion airbag, will come-out of the range of protection of the side airbag, and there is room for improvement from the standpoint of effectively protecting the femoral region.

In view of the above-described circumstances, an object of the present invention is to provide a passenger protecting device for a vehicle that, at the time of an oblique side collision of the vehicle, can suppress movement of a passenger toward the seat front side, and can effectively protect the femoral region.

A passenger protecting device for a vehicle of a first aspect includes: a side airbag portion that is accommodated at an interior of a side support portion that protrudes toward a seat upper side from a seat transverse direction outer side with respect to a seat portion of a seat cushion at a vehicle seat, and that, by receiving a supply of gas and inflating at a time of a side collision including an oblique side collision of a vehicle, causes the side support portion to bulge toward the seat upper side, and protects a femoral region and a lumbar region of a passenger from the seat transverse direction outer side; and a seat cushion airbag portion that is accommodated at an interior of the seat portion, and that, by receiving a supply of gas and inflating at a time of a front collision including an oblique side collision of the vehicle, causes the seat portion to bulge toward the seat upper side and raises the femoral region of the passenger, inflation of the seat cushion airbag portion being completed later than that of the side airbag portion.

In the passenger protecting device for a vehicle of the first aspect, the side airbag portion is provided at the interior of the side support portion of the seat cushion. Due to this side airbag portion receiving a supply of gas an inflating at the time of a side collision including an oblique side collision of the vehicle, the side airbag portion causes the side support portion to bulge toward the seat upper side. Further, the femoral region and the lumbar region of the passenger are protected from the seat transverse direction outer side by this side airbag portion. On the other hand, the seat cushion airbag portion is provided at the interior of the seat portion of the seat cushion. Due to this seat cushion airbag portion receiving a supply of gas and inflating at the time of a front collision including an oblique side collision of the vehicle, the seat cushion airbag portion causes the seat portion to bulge toward the seat upper side. Due to the seat portion being made to bulge toward the seat upper side, the femoral region of the passenger is raised, and the occurrence of the submarine phenomenon is prevented or suppressed.

Further, inflation of the seat cushion airbag portion is completed later than the side airbag portion. Due thereto, for example, in the state in which inflation of the side airbag portion is completed immediately after an oblique side collision of the vehicle, inflation of the seat cushion airbag portion is not completed. Namely, because the femoral region of the passenger is not completely raised, the femoral region coming-out of the range of protection of the side airbag portion at the time of protecting the femoral region of the passenger from a collision body or the like, can be prevented or suppressed. Moreover, after an oblique side collision of the vehicle, at the time when the passenger moves toward the seat front side due to inertial force, inflation of the seat cushion airbag portion is completed later than the side airbag portion, and the femoral region of the passenger is completely raised. Due thereto, the occurrence of the submarine phenomenon can be prevented or suppressed.

In a passenger protecting device for a vehicle of a second aspect, in the first aspect, the side airbag portion and the seat cushion airbag portion are in communication with each other, an inflator, that supplies gas to the side airbag portion and the seat cushion airbag portion, is provided at an interior of the seat cushion, and inflation of the side airbag portion by gas generated from the inflator is prioritized.

In the passenger protecting device for a vehicle of the second aspect, the side airbag portion and the seat cushion airbag portion receive a supply of gas from a common inflator and inflate. Due thereto, the number of inflators can be reduced as compared with a structure in which the side airbag portion and the seat cushion airbag portion receive a supply of gas from separate inflators and inflate. Further, by causing the side airbag portion to inflate prioritarily (earlier), completion of inflation of the seat cushion airbag portion can be delayed even in a structure in which the side airbag portion and the seat cushion airbag portion are in communication with each other.

In a passenger protecting device for a vehicle of a third aspect, in the second aspect, a recessed portion that is hollowed-out toward a seat front side is formed between the side airbag portion and the seat cushion airbag portion, and the side airbag portion and the seat cushion airbag portion are communicated with each other at a front end portion at a seat front side at the seat cushion.

In the passenger protecting device for a vehicle of the third aspect, because the side airbag portion and the seat cushion airbag portion are communicated with each other at the front end portion of the seat cushion, gas generated from the inflator flows through the side airbag portion and the seat cushion airbag portion respectively from the seat front side toward the seat rear side. Here, the seat cushion airbag portion is disposed at the seat lower side of the femoral region of the passenger, in order to raise the femoral region of the passenger. Therefore, the seat cushion airbag portion is pushed toward the seat lower side by the femoral region. Further, the region between the side airbag portion and the seat cushion airbag portion is hollowed-out toward the seat front side by the recessed portion. Due thereto, it is difficult for the gas generated from the inflator to flow to the seat cushion airbag portion. Namely, gas from the inflator flows prioritarily to the side airbag portion, and completion of inflation of the seat cushion airbag portion can be delayed.

In a passenger protecting device for a vehicle of a fourth aspect, in the second aspect or the third aspect, a flow regulating cloth, that guides gas generated from the inflator to the side airbag portion, is provided.

In the passenger protecting device for a vehicle of the fourth aspect, gas can be made to flow prioritarily to the side airbag portion, as compared with a structure in which the flow regulating cloth is not provided. Namely, completion of inflation of the seat cushion airbag portion can be delayed. Further, the time until inflation of the seat cushion airbag portion is completed can be adjusted merely by changing the length and/or the shape of the flow regulating cloth.

In a passenger protecting device for a vehicle of a fifth aspect, in the second aspect, the side airbag portion and the seat cushion airbag portion are configured by separate base cloths, and are communicate with each other via communication holes, and a gas flow path is formed such that gas generated from the inflator flows from the side airbag portion via the communication holes to the seat cushion airbag portion.

In the passenger protecting device for a vehicle of the fifth aspect, gas generated from the inflator flows to the side airbag portion, and thereafter, flows via the communication holes to the seat cushion airbag portion that is structured by a separate base cloth. Due thereto, gas can be made to flow prioritarily to the side airbag portion, and completion of inflation of the seat cushion airbag portion can be delayed.

In a passenger protecting device for a vehicle of a sixth aspect, in the fifth aspect, an internal space of the seat cushion airbag portion is partitioned by a tether into a front chamber at a seat front side and a rear chamber at a seat rear side, and the communication holes comprise a first communication hole that communicates the front chamber and the side airbag portion, and a second communication hole that communicates the rear chamber and the side airbag portion, and the inflator is disposed at the front chamber.

In a passenger protecting device for a vehicle of a seventh aspect, in any one of the first aspect through the sixth aspect, the seat cushion airbag portion is accommodated at the interior of the seat portion in a folded-up state, and the side airbag portion is accommodated at the interior of the side support portion in a state of being deployed without being folded.

In a passenger protecting device for a vehicle of an eighth aspect, in any one of the first aspect through the sixth aspect, the seat cushion airbag portion is accommodated at the interior of the seat portion in a folded-up state, and the side airbag portion is accommodated at the interior of the side support portion in a state of being folded a number of times that is less than a number of times that the seat cushion airbag portion is folded.

In the passenger protecting devices for a vehicle of the seventh aspect and the eighth aspect, the seat cushion airbag portion that is folded a large number of times requires more time for expansion than the side airbag portion that is not folded or that is folded a few number of times. Due thereto, completion of inflation of the seat cushion airbag portion can be delayed. Further, the time until inflation of the seat cushion airbag portion is completed can be adjusted merely by increasing or decreasing the number of times of folding.

In a passenger protecting device for a vehicle of a ninth aspect, in any one of the first aspect through the fifth aspect, the seat cushion airbag portion has an inflation limiting member that breaks at a predetermined inflation pressure, and a base cloth that configures the seat cushion airbag portion is connected in a seat vertical direction by the inflation limiting member.

In the passenger protecting device for a vehicle of the ninth aspect, the base cloth that configures the seat cushion airbag portion is connected in the seat vertical direction by the inflation limiting member. Further, because this inflation limiting member is not broken until a predetermined inflation pressure is reached, completion of inflation of the seat cushion airbag portion can be delayed.

In a passenger protecting device for a vehicle of a tenth aspect, in any one of the first aspect through the ninth aspect, the side airbag portion is, in an inflated state, provided at a position that overlaps a center of gravity of the femoral region and a hip point of the passenger as seen from a seat transverse direction, and an upper end of the side airbag portion in the inflated state is inclined along the seat portion toward a seat lower side from a seat front side toward a seat rear side.

In the passenger protecting device for a vehicle of the tenth aspect, the side airbag portion is inflated to a position that overlaps the center of gravity of the femoral region and the hip point of the passenger, as seen from the seat transverse direction. Due thereto, a wide range from the femoral region to the lumbar region of the passenger can be protected at the time of an oblique side collision of the vehicle. Further, due to the upper end of the side airbag portion being inclined along the seat portion toward the seat lower side from the seat front side toward the seat rear side, interference with another airbag portion, that is inflated and expanded from the seatback or the headrest, can be suppressed. Moreover, the side airbag portion can be structured compactly as compared with a structure in which the end portion at the seat front side and the end portion at the seat rear side of the side airbag portion are positioned at the same height in the seat vertical direction (a structure in which the side airbag portion is not inclined).

As described above, the passenger protecting device for a vehicle of the first aspect has the excellent effect that movement of the passenger toward the seat front side at the time of an oblique side collision of the vehicle can be suppressed, and the femoral region can be protected effectively.

The passenger protecting device for a vehicle of the second aspect has the excellent effect that conservation of space and a reduction in cost can be devised.

The passenger protecting devices for a vehicle of the third through ninth aspects have the excellent effect that the completion of inflation of the seat cushion airbag portion can be delayed by a simple structure.

The passenger protecting device for a vehicle of the tenth aspect has the excellent effect that, while the wide range from the femoral region to the lumbar region of the passenger is protected, interference with other airbags can be suppressed.

DETAILED DESCRIPTION

<First Embodiment>

A passenger protecting device 10 for a vehicle relating to a first embodiment of the present invention is described on the basis of FIG. 1 through FIG. 6. Note that arrow FR and arrow UP that are shown appropriately in the respective drawings indicate the forward direction (the direction in which a seated person faces) and the upward direction of a vehicle seat 12, respectively. Further, when description is given by using merely longitudinal, vertical and left-right directions, they mean the longitudinal of the seat longitudinal direction, the vertical of the seat vertical direction, and left and right when facing forward in the seat longitudinal direction, unless stated otherwise. Moreover, arrow OUT that is shown appropriately in the respective drawings means the vehicle transverse direction outer side at an automobile that serves as a vehicle in which the vehicle seat 12 is installed.

(Structure of Passenger Protecting Device for Vehicle)

Figure 1:
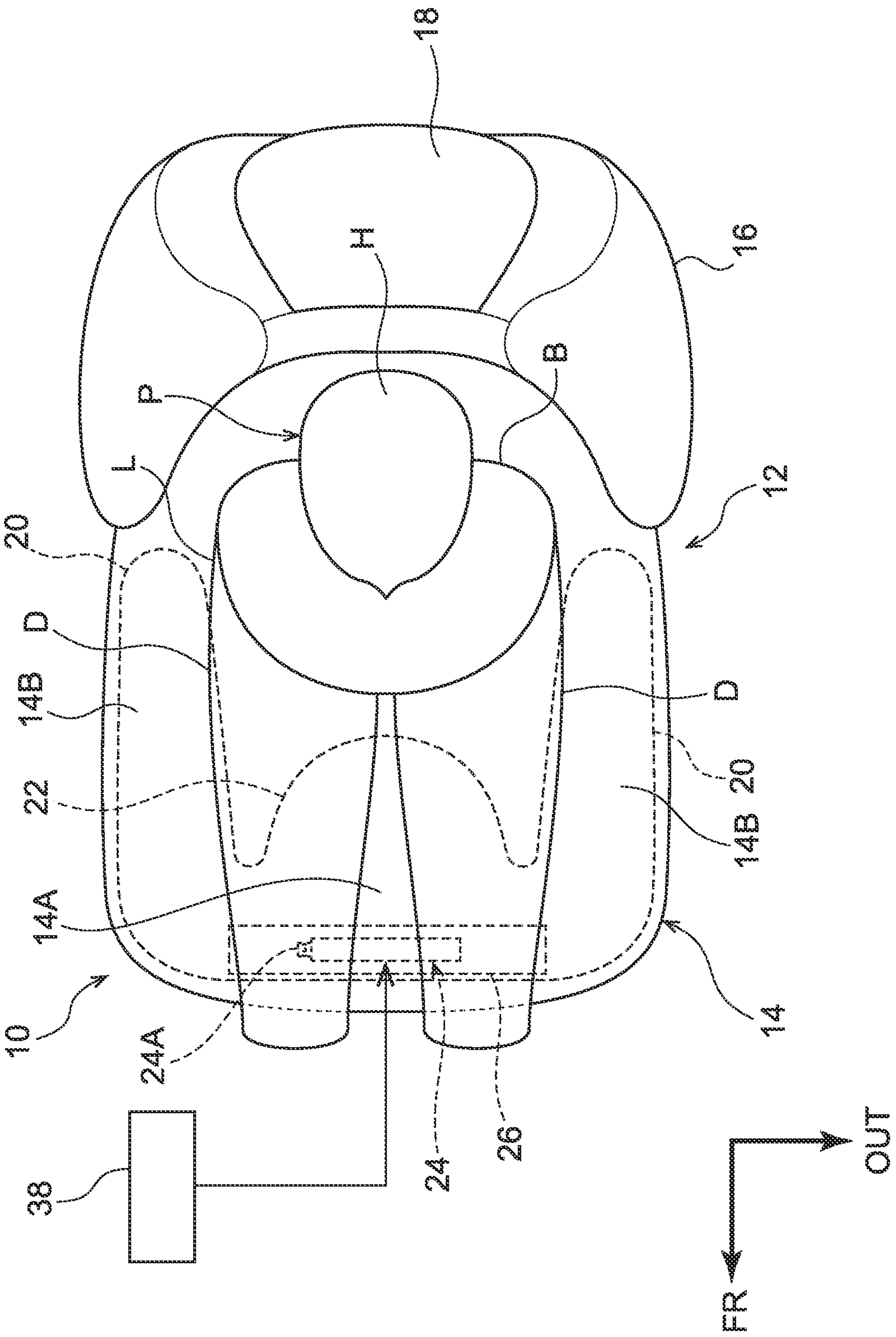
FIG. 1 is a plan view of a vehicle seat to which a passenger protecting device for a vehicle relating to a first embodiment is applied.

As shown in FIG. 1, the passenger protecting device 10 for a vehicle of the present embodiment (hereinafter simply called "passenger protecting device 10") is installed in a vehicle seat 12, and is structured to include a pair of side airbag portions 20, a seat cushion airbag portion 22, an inflator 24, and a diffuser 26 that serves as a flow regulating cloth.

The vehicle seat 12 is disposed so as to be offset toward either of the left or the right (the left side in the present embodiment) with respect to the vehicle transverse direction center of the vehicle body of the unillustrated automobile. Further, in the present embodiment, the seat longitudinal direction of the vehicle seat 12 coincides with the longitudinal direction of the vehicle, and the seat transverse direction coincides with the vehicle transverse direction.

Note that, the respective drawings illustrate a state in which a crash test dummy (mannequin) is seated on a seat cushion 14 of the vehicle seat 12 as a model of a passenger who is to be protected. The dummy is, for example, an AM50 (50th percentile U.S. adult male) World SID (internationally standardized side crash dummy: World Side Impact Dummy). This dummy is seated in a standard seated posture that is prescribed by the crash test method, and the vehicle seat 12 is positioned at a standard set position that corresponds to this seated posture. Hereinafter, in order to make the explanation easy to understand, the dummy is called "passenger P".

The vehicle seat 12 is structured to include the seat cushion 14 that is for supporting a lumbar region L (which, here, includes the buttocks) and a femoral region D of the passenger P, a seatback 16 for supporting a back portion B of the passenger P, and a headrest 18 for supporting a head portion H of the passenger P.

Figure 4:
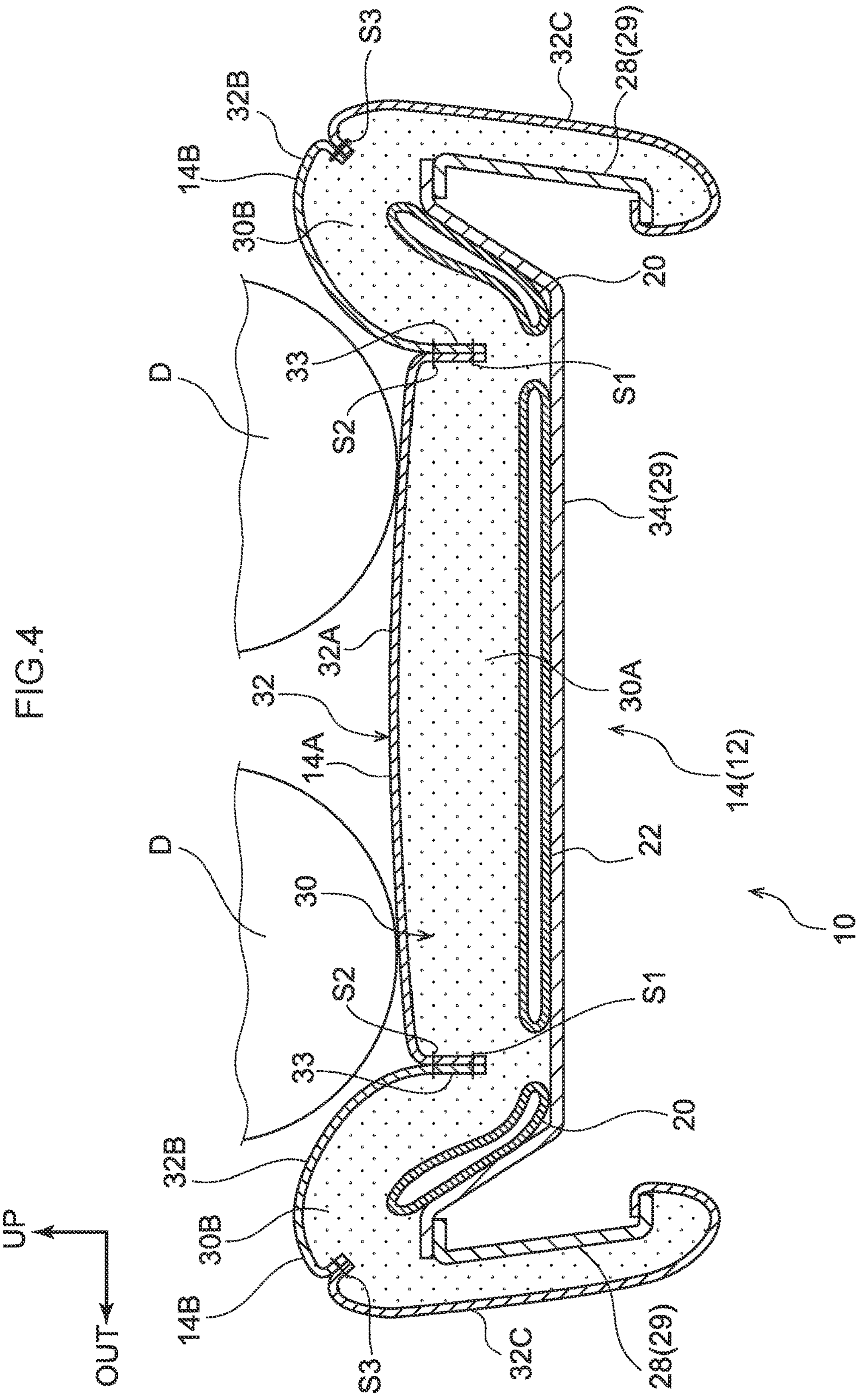
FIG. 4 is a cross-sectional view showing, in an enlarged manner, the state cut along line 4-4 of FIG. 2, and is a drawing showing a non-inflated state before the side airbag portions and a seat cushion airbag portion inflate.

As shown in FIG. 4, the seat cushion 14 is structured to include a seat portion 14A (general portion) on which the passenger P sits, and side support portions 14B that jut-out toward the seat upper side from the seat transverse direction outer sides with respect to the seat portion 14A. Further, in the present embodiment, the pair of side support portions 14B are provided at the seat transverse direction both sides with respect to the seat portion 14A. The pair of side support portions 14B are for suppressing lateral shifting of the lumbar region L and the femoral region D of the passenger P. Side frames 28, that structure a seat cushion frame 29 that is the frame of the seat cushion 14, are disposed at the side support portions 14B.

The side frames 28 are disposed such that the plate thickness directions thereof are the seat transverse direction. Further, the seat cushion frame 29 has a reaction force plate 34 that connects the left and right side frames 28 in the seat transverse direction. Here, a seat cushion pad 30, that is formed from a foamed body such as a urethane pad or the like, is mounted to the seat cushion frame 29 from the upper side. At the seat cushion pad 30, the region provided at the seat portion 14A is a pad central portion 30A, and the regions provided at the left and right side support portions 14B are pad side portions 30B. Further, the surface of the seat cushion pad 30 is covered by a seat skin 32.

The seat skin 32 has an upper skin 32A that covers the surface (top surface) of the pad central portion 30A, left and right upper side skins 32B that cover the top surfaces of the left and right pad side portions 30B, and left and right side skin portions 32C that cover the side surfaces of the left and right pad side portions 30B. The seat transverse direction both end portions of the upper skin 32A are sewn to the seat transverse direction inner side end portions of the left and right upper side skins 32B at sewn portions S1 and sewn portions S2 respectively.

Further, the seat transverse direction outer side end portions of the left and right upper side skins 32B are sewn to the upper end portions of the left and right side skins 32C at sewn portions S3 respectively. The lower end portions of the left and right side skins 32C are anchored on the lower end portions of the left and right side frames 28.

Here, the sewn portions S2 are provided further toward the upper side than the sewn portions S1, and are weaker than the sewn portions S1. Therefore, excess length portions 33 are provided at the seat skin 32 respectively at the respective border portions between the seat portion 14A and the left and right side support portions 14B. Further, at the time when the side airbag portions 20 and the seat cushion airbag portion 22 that are described later inflate, the excess length portions 33 are extended due to the sewn portions S2 breaking. Note that there may be a structure in which the excess length portions 33 are not provided.

Here, the seat cushion airbag portion 22 that structures the passenger protecting device 10 is accommodated between the pad central portion 30A and the seat cushion frame 29 (the reaction force plate 34). Further, the side airbag portions 20 that structure the passenger protecting device 10 are accommodated between the left and right pad side portions 30B and the seat cushion frame 29. The seat cushion airbag portion 22 and the side airbag portions 20 are formed in the shapes of bags by cloth materials (base cloths) of nylon or polyester for example being sewn.

As shown in FIG. 1, the seat cushion airbag portion 22 is accommodated at the interior of the seat portion 14A of the seat cushion 14, and the side airbag portions 20 are accommodated at the interiors of the side support portions 14B. Here, the side airbag portions 20 are disposed as a pair at the both sides in the seat transverse direction with respect to the seat cushion airbag portion 22, and the pair of side airbag portions 20 and the seat cushion airbag portion 22 are communicated with each other at the front end portion of the seat cushion 14.

Figure 2:
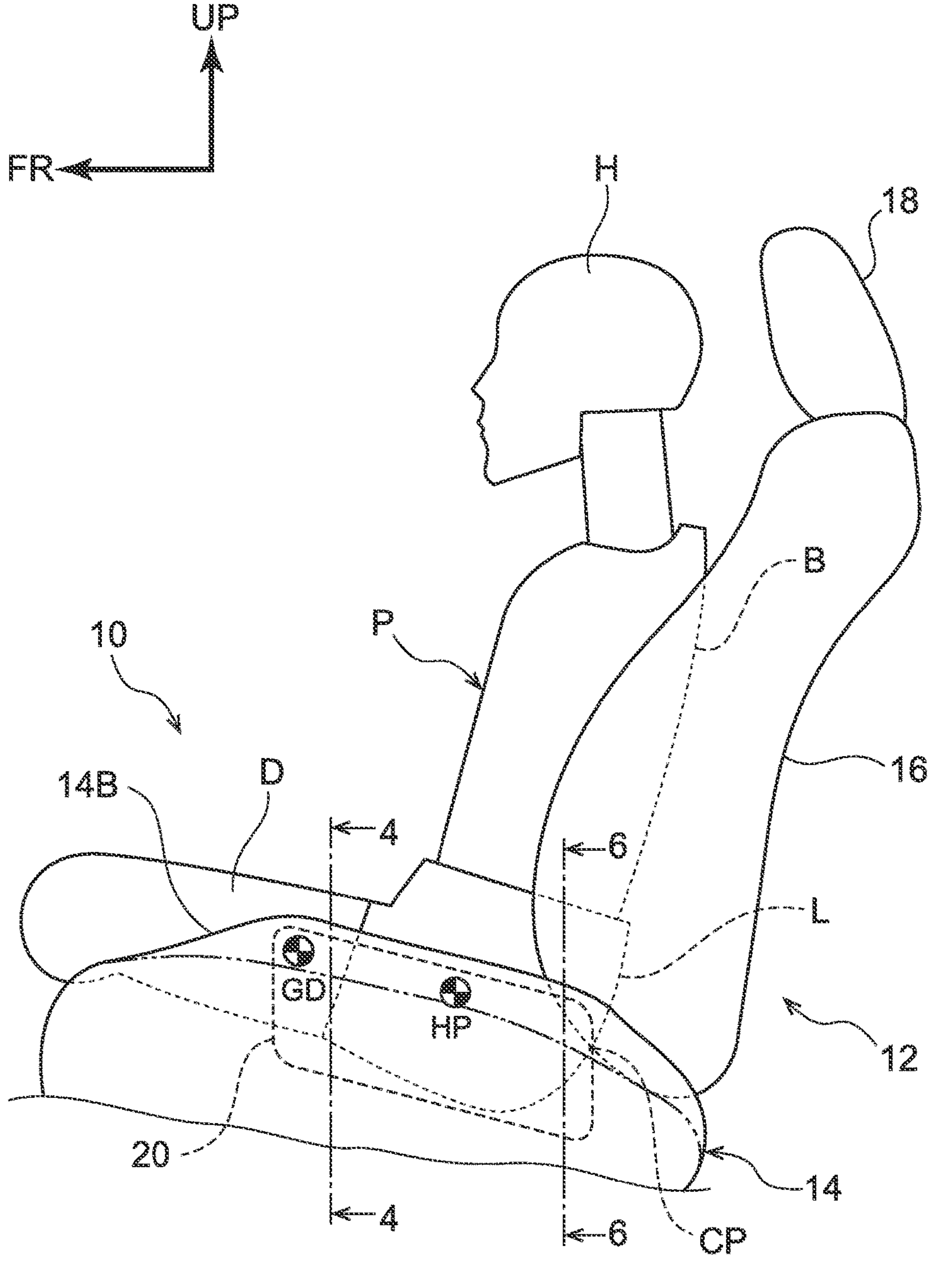
FIG. 2 is a side view of the vehicle seat to which the passenger protecting device for a vehicle relating to the first embodiment is applied, and is a drawing showing an inflated state of a side airbag portion.

As shown in FIG. 2, the side airbag portion 20 extends from the lumbar region L to the femoral region D of the passenger P. Further, the front end portion of the side airbag portion 20 in its inflated state overlaps center of gravity GD of the femoral region D as seen from the seat transverse direction. Further, the seat longitudinal direction intermediate portion of the side airbag portion 20 in its inflated state overlaps hip point HP as seen from the seat transverse direction.

Here, the upper end of the side airbag portion 20 in its inflated state is inclined along the seat portion 14A of the seat cushion 14, toward the seat lower side while heading from the seat front side toward the seat rear side. Further, the rear end portion of the side airbag portion 20 is positioned at intersection point CP of the seat design and the outer shape of the lumbar region L as seen from the seat transverse direction. Note that side airbag portion 20 at the opposite side of the passenger P is structured similarly.

As shown in FIG. 1, the seat cushion airbag portion 22 is disposed beneath the femoral region D of the passenger P. This is a structure in which, due the seat cushion airbag portion 22 inflating, the seat cushion airbag portion 22 makes the seat portion 14A bulge-out toward the seat upper side and raises the femoral region D of the passenger P.

Figure 3:
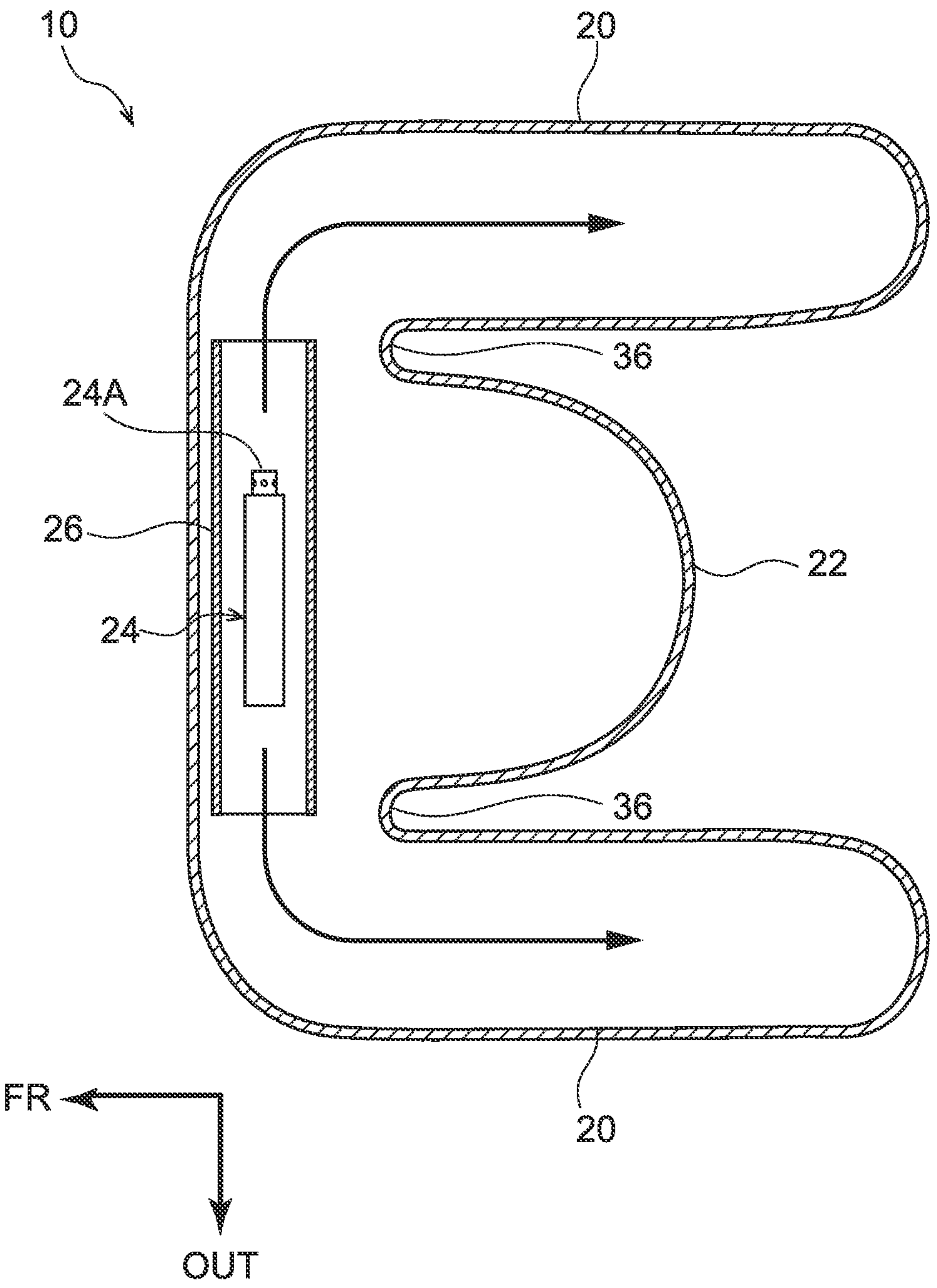
FIG. 3 is an enlarged plan sectional view of the passenger protecting device for a vehicle relating to the first embodiment.

As shown in FIG. 3, recessed portions 36 (choke portions) that are hollowed-out toward the seat front side are formed at the border portions between the side airbag portions 20 and the seat cushion airbag portion 22. The recessed portions 36 are formed at both sides in the seat transverse direction of the seat cushion airbag portion 22, and the portions where the side airbag portions 20 and the seat cushion airbag portion 22 communicate (the communicating portions) are narrowed by these recessed portions 36. Further, the inflator 24 is disposed at the front end portion of the seat cushion 14 at which the side airbag portions 20 and the seat cushion airbag portion 22 communicate with one another.

The inflator 24 is a so-called cylinder-type inflator, and is accommodated within the front end portion of the seat cushion airbag portion 22 with the seat transverse direction being the length direction thereof. A gas jetting portion 24A is provided at a length direction one end portion of the inflator 24. Moreover, the diffuser 26, that guides the gas generated by the inflator 24 to the side airbag portions 20, is provided at the outer side of the inflator 24. The diffuser 26 is formed in the shape of a tube whose both end sides in the seat transverse direction are open, and extends to vicinities of the left and right recessed portions 36. Therefore, as shown by the arrows, the gas generated at the inflator 24 flows from the openings at the seat transverse direction both end sides of the diffuser 26 to the side airbag portions 20.

As shown in FIG. 1, the inflator 24 is electrically connected to an ECU 38 that is a control section. The ECU 38 is electrically connected to a collision sensor that senses a collision of the vehicle, or the like. The collision sensor is structured by, for example, an acceleration sensor that detects the acceleration of the vehicle, or the like, and is structured so as to be able to detect collisions of various forms.

Further, the ECU 38 causes the inflator 24 to operate at the time of sensing that the vehicle is involved in a collision on the basis of a signal from the unillustrated collision sensor. Note that, in a case in which a pre-crash sensor that predicts a collision of the vehicle is electrically connected to the ECU 38, the ECU 38 may be structured so as to cause the inflator 24 to operate at the time when the ECU 38 predicts a collision of the vehicle on the basis of a signal from the pre-crash sensor.

Figure 5:
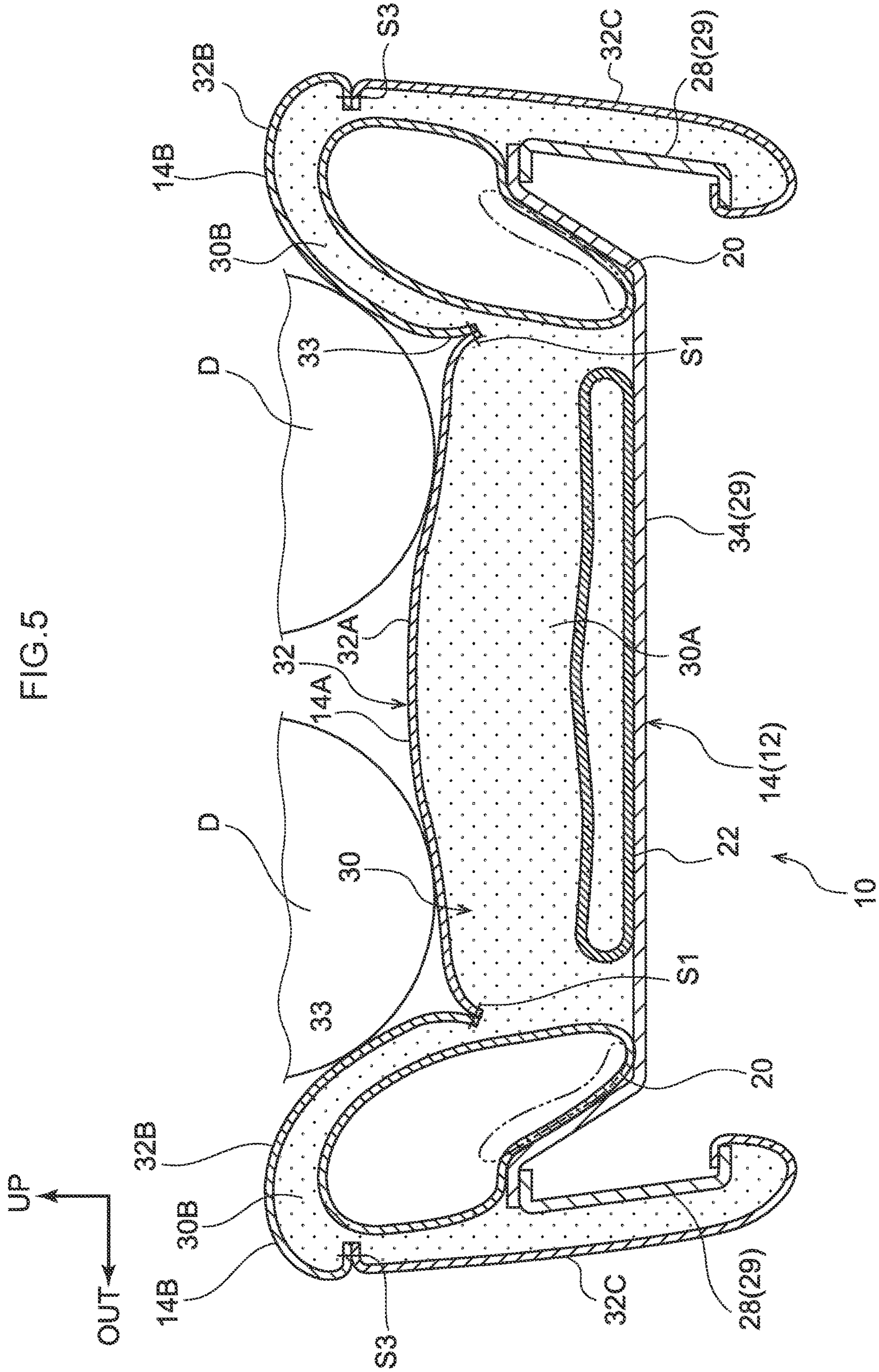
FIG. 5 is a cross-sectional view that corresponds to FIG. 4 and shows a state in the midst of inflation of the side airbag portions and the seat cushion airbag portion.
Figure 6:
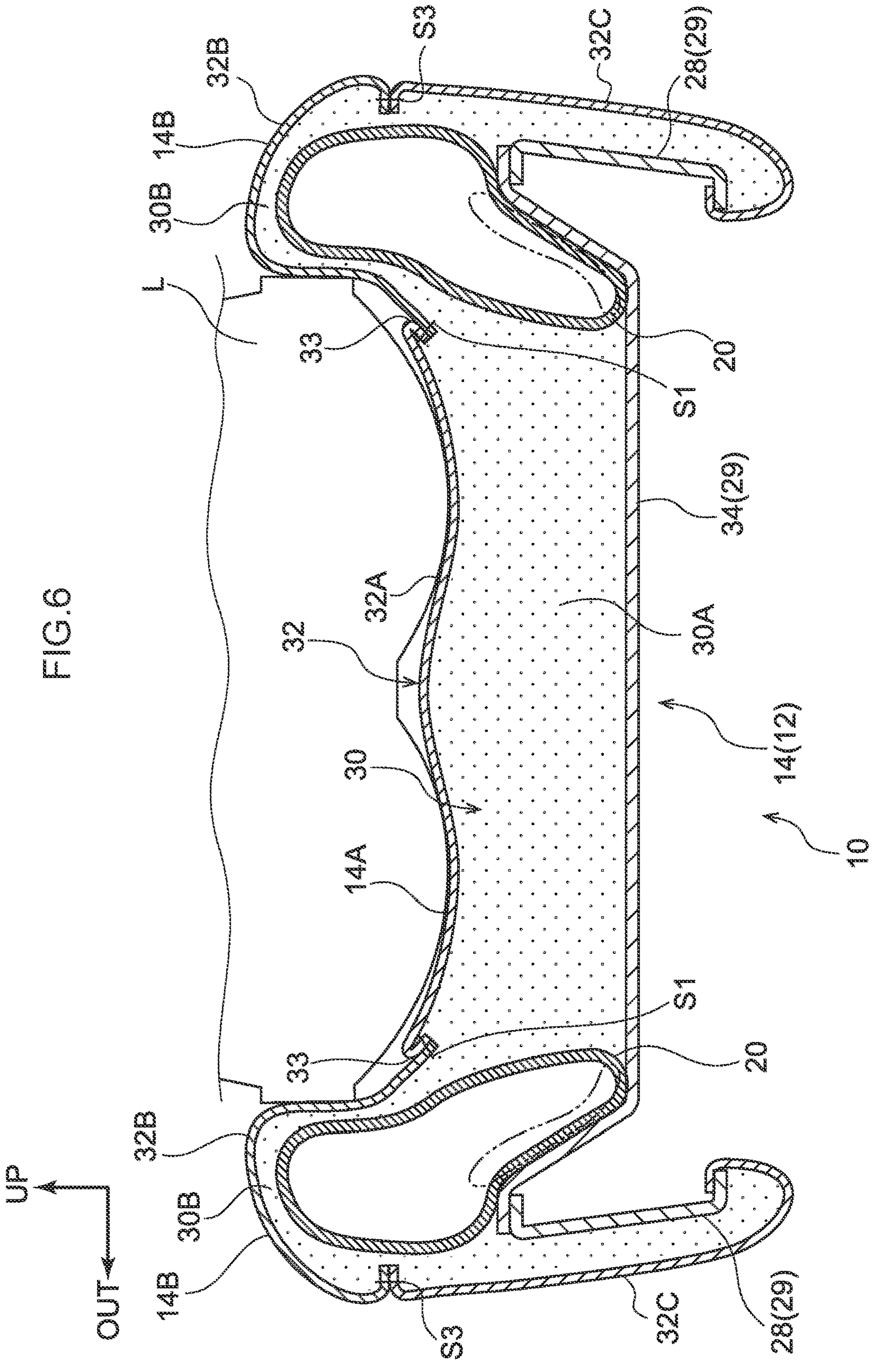
FIG. 6 is a cross-sectional view showing, in an enlarged manner, the state cut along line 6-6 of FIG. 2, and is a drawing showing a state in the midst of inflation of the side airbag portions.

Due to the inflator 24 operating, gas is jetted-out from the gas jetting portion 24A of the inflator 24. Due thereto, gas is supplied via the diffuser 26 to the side airbag portions 20 and the seat cushion airbag portion 22. Further, as shown in FIG. 5 and FIG. 6, due to the side airbag portions 20 inflating, the side support portions 14B are bulged-out toward the seat upper side, and protect and restrain the femoral region D and the lumbar region L of the passenger P from the seat transverse direction outer sides.

Here, the present embodiment is structured such that gas flows prioritarily to the side airbag portions 20 by the diffuser 26. Further, because the seat cushion airbag portion 22 is pushed toward the seat lower side by the femoral region D of the passenger P, it is difficult for gas to flow to the seat cushion airbag portion 22. Thus, inflation of the seat cushion airbag portion 22 is completed later than the side airbag portions 20. Namely, there is a structure in which, in the state shown in FIG. 5, inflation of the seat cushion airbag portion 22 is not completed, and, for example, inflation of the seat cushion airbag portion 22 is completed 10 to 20 msec after the completion of inflation of the side airbag portions 20.

(Operation and Effects)

Operation and effects of the present embodiment are described next.

In the passenger protecting device 10 of the present embodiment, when the vehicle is involved in an oblique side collision, the inflator 24 is operated by the ECU 38, and gas is generated. Here, as shown in FIG. 1 and FIG. 3, the diffuser 26 is provided at the outer side of the inflator 24, and gas flows prioritarily to the side airbag portion 20 via this diffuser 26. Further, because the seat cushion airbag portion 22 is pushed by the femoral region D of the passenger P, it is difficult for gas to flow thereto. Therefore, inflation of the side airbag portions 20 is completed earlier. Further, as shown in FIG. 2, due to the side airbag portions 20 inflating, the side support portions 14B are bulged-out toward the seat upper side and protect the femoral region D and the lumbar region L of the passenger P from the seat transverse direction outer sides.

In this way, because there is a structure in which the side support portions 14B are bulged-out toward the seat upper side and protect the femoral region D and the lumbar region L of the passenger P, there is no need to form sewn portions or the like that become rupture starting points, as compared with a structure in which the seat portion 14A and the side support portions 14B are ruptured and airbags are inflated and expanded. As a result, the appearance of the vehicle seat 12 can be ensured. Further, in a structure in which the seat portion 14A and the side support portions 14B are ruptured and airbags are inflated and expanded, the side support portions are rubbed at times when a passenger enters and exits the vehicle, and therefore, strength is required of the seat skin, but, on the other hand, the sewn portions must be ruptured even by a low output, and it is difficult to achieve both. In contrast, in the present embodiment, there is a structure in which the side support portions 14B are made to bulge-out toward the seat upper side and the side support portions 14B protect the femoral region D and the lumbar region L of the passenger P, and therefore, there is no need to provide sewn portions, and the strength of the seat skin can be increased.

Then, due to the seat cushion airbag portion 22 inflating later than the side airbag portions 20, the seat portion 14A is made to bulge-out toward the seat upper side, and the femoral region D of the passenger P is raised. Due thereto, the occurrence of the so-called submarine phenomenon, in which the the passenger P becomes a posture of burrowing-in toward the seat front side, is prevented or suppressed. Further, because the side support portions 14B are bulging-out toward the seat upper side, the femoral region D and the lumbar region L of the passenger P are restrained, and inertial movement of the passenger P in the seat transverse direction is prevented or suppressed.

In particular, in the form of a collision such as an oblique side collision or the like, by inflating the side airbag portions 20 at an early stage and causing the side support portions 14B to bulge-out toward the seat upper side, the femoral region D and the lumbar region L of the passenger P can be protected from the collision body and the like.

Figure 13:
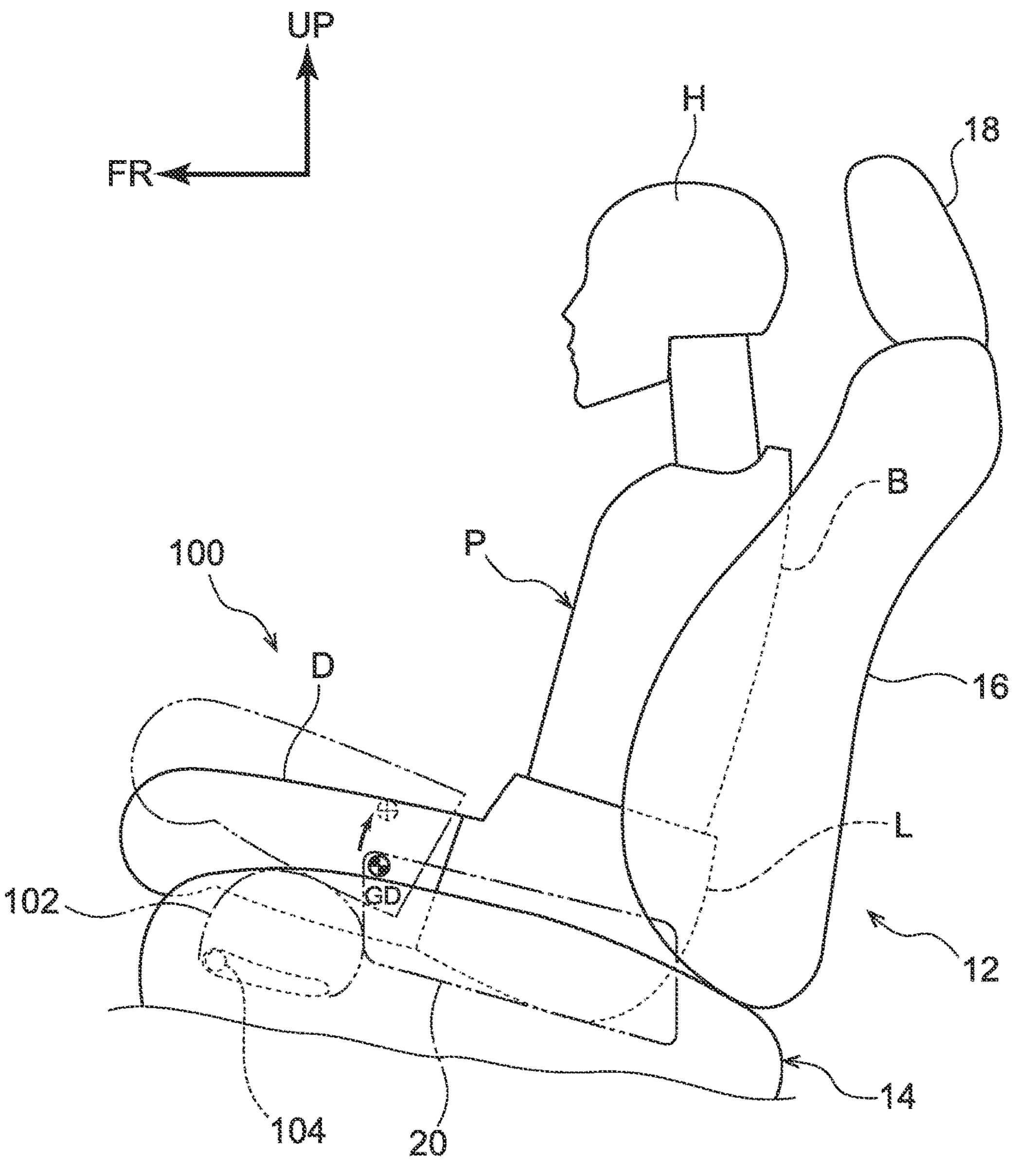
FIG. 13 is a side view of a vehicle seat to which a passenger protecting device for a vehicle relating to a comparative example is applied, and is a drawing showing a state in which inflation of a seat cushion airbag portion is completed.

Further, the femoral region D of the passenger P can be effectively protected as compared with a structure in which inflation of the seat cushion airbag portion 22 and the side airbag portions 20 is completed simultaneously or a structure in which inflation of the seat cushion airbag portion 22 is completed earlier. This effect is described with reference to a passenger protecting device 100 of a comparative example that is shown in FIG. 13. Note that, in FIG. 13, structures that are similar to those of the present embodiment are denoted by the same reference numerals. Further, the side airbag portions 20 are not provided at the passenger protecting device 100, but, for comparison with the passenger protecting device 10 of the present embodiment, the inflated state of the side airbag portion 20 of the present embodiment is shown by the imaginary line.

In the comparative example shown in FIG. 13, a seat cushion airbag 102 is accommodated at the interior of the front end portion of the seat cushion 14. Further, an inflator 104 is provided at the interior of the seat cushion airbag 102.

Here, when the inflator 104 operates and the seat cushion airbag 102 inflates, as shown by the imaginary line in the drawing, the seat portion of the seat cushion 14 bulges-out toward the seat upper side, and the femoral region D of the passenger P is raised. Due to the femoral region D being raised in this way, the center of gravity GD of the femoral region D moves further toward the seat upper side than the side airbag portions 20 in the inflated state. Therefore, there is room for improvement from the standpoint of protecting the femoral region D of the passenger P from a collision body or the like immediately after an oblique side collision of the vehicle.

In contrast, in the present embodiment, as shown in FIG. 2, inflation of the side airbag portions 20 is completed first, immediately after an oblique side collision of the vehicle. Therefore, the femoral region D coming-out of the range of protection of the side airbag portions 20 at the time of protecting the femoral region D of the passenger P from a collision body or the like, can be prevented or suppressed. Further, due to inflation of the seat cushion airbag portion 22 being completed later than the side airbag portions 20, the femoral region D being raised and movement of the passenger P toward the seat front side can be prevented or suppressed. In this way, while the appearance of the vehicle seat 12 is ensured, movement of the passenger P toward the seat front side at the time of an oblique side collision of the vehicle can be suppressed, and the femoral region D can be effectively protected.

Further, the side airbag portions 20 and the seat cushion airbag portion 22 can be inflated and can protect the passenger P at an appropriate time also at the time of a front collision or at the time of a side collision of the vehicle. For example, in a case in which the vehicle is involved in a front collision, the inflator 24 is operated by the ECU 38, and gas is generated. Due thereto, as described above, the side airbag portions 20 and the seat cushion airbag portion 22 inflate. Here, after the front collision is sensed by the unillustrated collision sensor, inertial movement of the passenger P toward the seat front side begins after a predetermined time elapses. On the other hand, because the seat cushion airbag portion 22 inflates later than the side airbag portions 20, the seat portion 14A is made to bulge-out toward the seat upper side and raises the femoral region D of the passenger P up at the time when the inertial movement of the passenger P toward the seat front side starts. In this way, the occurrence of the submarine phenomenon at the time of a front collision of the vehicle can be prevented or suppressed.

Similarly, in a case in which the vehicle is involved in a side collision, the inflator 24 is operated by the ECU 38, gas is generated, and the side airbag portions 20 and the seat cushion airbag portion 22 inflate. Here, at the time of a side collision, there is the need to rapidly protect the femoral region D and the lumbar region L of the passenger P from a collision body or the like. At this time, because the gas generated from the inflator 24 flows prioritarily to the side airbag portions 20, the side airbag portions 20 inflate at an early stage and cause the side support portions 14B to bulge-out toward the seat upper side. In this way, at the time of a side collision of the vehicle, the femoral region D and the lumbar region L of the passenger P can be protected effectively. Further, because inflation of the seat cushion airbag portion 22 is completed later, the femoral region D coming-out of the range of protection of the side airbag portions 20 at the time when protection of the femoral region D of the passenger P is needed, can be prevented or suppressed.

Further, the present embodiment is structured such that the side airbag portions 20 and the seat cushion airbag portion 22 communicate with one another, and inflate by receiving a supply of gas from the common inflator 24. Due thereto, the number of inflators can be reduced as compared with a structure in which the side airbag portions 20 and the seat cushion airbag portion 22 inflate by receiving a supply of gas from separate inflators. Namely, conservation of space and a reduction in cost can be devised.

Moreover, in the present embodiment, the time until inflation of the seat cushion airbag portion 22 is completed can be adjusted merely by changing the length and/or the shape of the diffuser 26. For example, if the length of the diffuser 26 in the seat transverse direction is made to be short, the amount of gas that flows from the diffuser 26 to the seat cushion airbag portion 22 is large, and the time until inflation of the seat cushion airbag portion 22 is completed is short. Conversely, if the length of the diffuser 26 in the seat transverse direction is made to be long, the amount of gas that flows from the diffuser 26 to the seat cushion airbag portion 22 is small, and the time until inflation of the seat cushion airbag portion 22 is completed is long. In this way, the time until inflation of seat cushion airbag portion 22 is completed can be adjusted.

Further, in the present embodiment as shown in FIG. 2, the side airbag portion 20 is inflated to a position overlapping the center of gravity GD of the femoral region D and the hip point HP of the passenger P as seen from the seat transverse direction. Moreover, as seen from the seat transverse direction, the rear end portion of the side airbag portion 20 that is in the inflated state is positioned at the intersection point CP of the seat design and the outer shape of the lumbar region L. Due thereto, a wide range of the passenger P from the femoral region D to the lumbar region L can be protected at the time of an oblique side collision of the vehicle. In particular, in a structure in which an airbag is expanded from the seatback 16, the airbag interferes with the side support portion 14B and it is difficult to effectively protect the femoral region D and the lumbar region L of the passenger P. In contrast, in the present embodiment, the femoral region D and the lumbar region L of the passenger P can be effectively protected by causing the side support portions 14B to bulge-out.

Moreover, the upper end of the side airbag portion 20 is inclined, along the seat portion 14A, toward the seat lower side while heading from the seat front side toward the seat rear side. Due thereto, interference with other airbags that are inflated and expanded from the seatback 16 or the headrest 18 can be suppressed. Further, the side airbag portion 20 can be structured compactly, as compared with a structure in which the end portion at the seat front side and the end portion at the seat rear side of the side airbag portion 20 are positioned at the same height in the seat vertical direction (a structure in which the side airbag portion 20 is not inclined).

<Second Embodiment>

A passenger protecting device 40 for a vehicle relating to a second embodiment is described next on the basis of FIGS. 7A and 7B. Note that structures that are similar to those of the first embodiment are denoted by the same reference numerals, and description thereof is omitted as appropriate. Further, because the vehicle seat is structured similarly to the first embodiment, illustration and description thereof are omitted here.

Figure 7A:
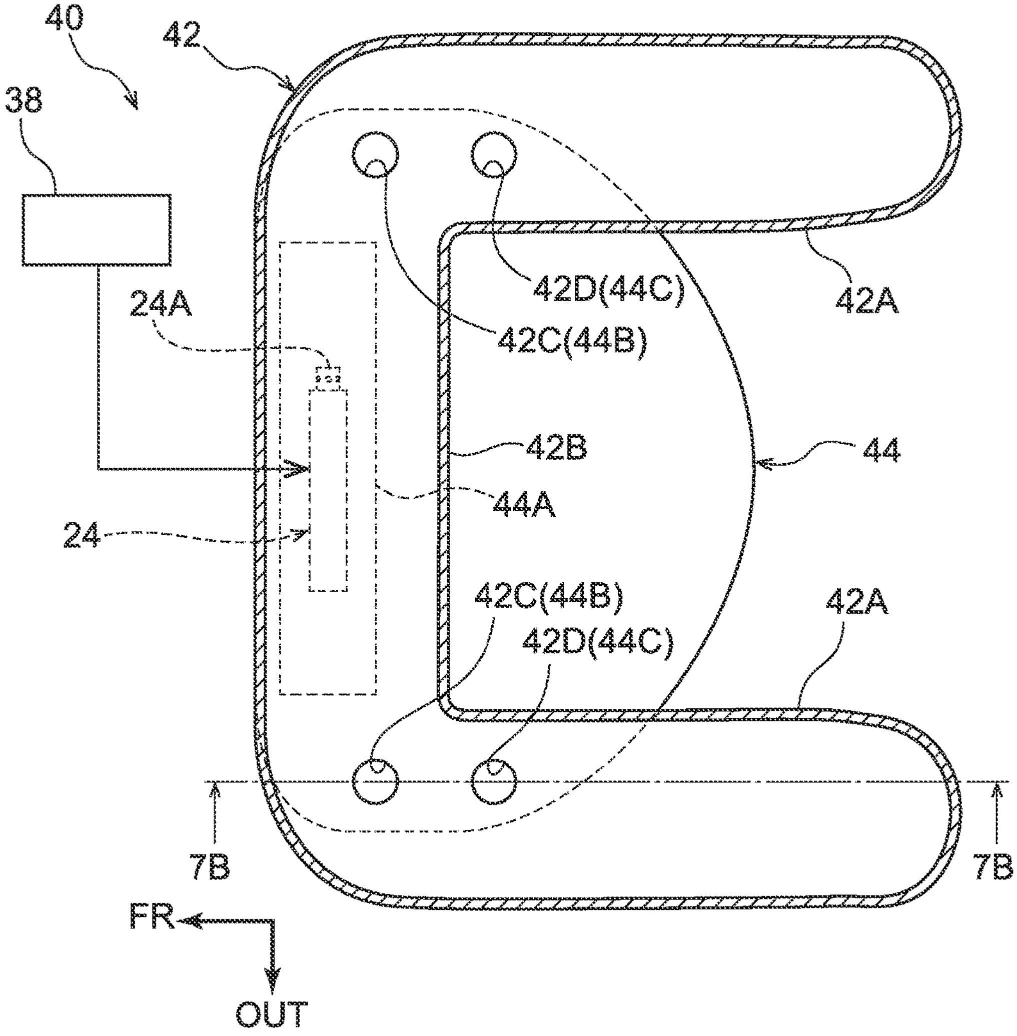
FIG. 7A is a plan sectional view showing a passenger protecting device for a vehicle relating to a second embodiment.
Figure 7B:
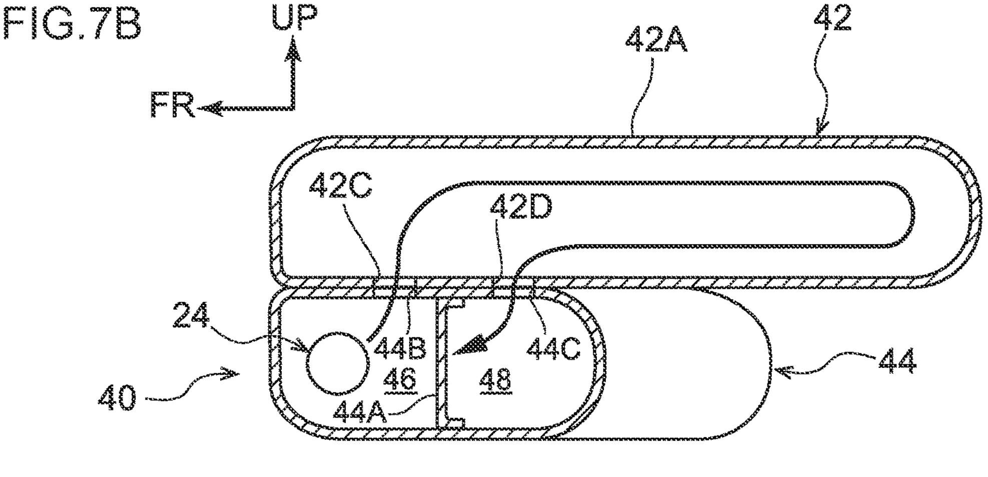
FIG. 7B is a cross-sectional view showing the state cut along line 7B-7B of FIG. 7A.

As shown in FIGS. 7A and 7B, at the passenger protecting device 40 for a vehicle of the present embodiment (hereinafter simply called "passenger protecting device 40"), a side airbag portion 42 and a seat cushion airbag portion 44 are structured by separate base cloths.

Concretely, the side airbag portion 42 is structured to include a pair of left and right side portions 42A that extend in the seat longitudinal direction, and a connecting portion 42B that extends in the seat transverse direction and connects the front end portions of the side portions 42A together. Therefore, the side airbag portion 42 is formed in a substantial U-shape whose seat rear side is open, as seen in plan view. Note that the side airbag portion 42 is not limited to this, and may be structured such that, for example, the connecting portion 42B is not provided, and the pair of side portions 42A are separated.

An upper side first communication hole 42C and an upper side side second communication hole 42D are formed in the base cloth at the seat lower side of the side portion 42A. The upper side first communication hole 42C is formed in the front end portion of the side portion 42A, and the upper side second communication hole 42D is formed at a position that is offset toward the seat rear side from the upper side first communication hole 42C. Further, the internal space of the side airbag portion 42 and the internal space of the seat cushion airbag portion 44 communicate via the upper side first communication hole 42C and the upper side second communication hole 42D. Note that the upper side first communication hole 42C and the upper side second communication hole 42D are formed in the pair of side portions 42A respectively.

The seat cushion airbag portion 44 is provided at the seat lower side of the side airbag portion 42. The seat cushion airbag portion 44 is formed in a substantially semicircular shape whose seat rear side is convex as seen in plan view. Further, as shown in FIG. 7B, a tether 44A that is a partitioning cloth is provided within the seat cushion airbag portion 44. The tether 44A extends from a seat transverse direction one end portion to the other end portion of the seat cushion airbag portion 44. Further, the upper end portion and the lower end portion of the tether 44A are sewn, respectively, to upper and lower base cloths that structure the seat cushion airbag portion 44. Therefore, the internal space of the seat cushion airbag portion 44 is partitioned by the tether 44A into a front chamber 46 at the seat front side and a rear chamber 48 at the seat rear side.

Further, a lower side first communication hole 44B and a lower side second communication hole 44C are formed in the base cloth that is at the seat upper side of the seat cushion airbag portion 44. The lower side first communication hole 44B is formed further toward the seat front side than the tether 44A, at a position corresponding to the upper side first communication hole 42C of the side airbag portion 42. Further, the lower side second communication hole 44C is formed further toward the seat rear side than the tether 44A, at a position corresponding to the upper side second communication hole 42D of the side airbag portion 42. Therefore, the side airbag portion 42 and the front chamber 46 communicate via the upper side first communication hole 42C and the lower side first communication hole 44B, and the side airbag portion 42 and the rear chamber 48 communicate via the upper side second communication hole 42D and the lower side second communication hole 44C. Further, the inflator 24 is disposed in the front chamber 46, and this inflator 24 is electrically connected to the ECU 38.

(Operation and Effects)

Operation and effects of the present embodiment are described next.

In the passenger protecting device 40 of the present embodiment, when the vehicle is involved in an oblique side collision, the inflator 24 is operated by the ECU 38, and gas is generated. Then, the gas generated from the inflator 24 flows as shown by the arrow in the drawing from the front chamber 46 via the upper side first communication holes 42C and the lower side first communication holes 44B into the side airbag portion 42. Due thereto, the side airbag portion 42 is inflated and causes the side support portions 14B to bulge-out toward the seat upper side (see FIG. 2).

Then, due to gas flowing from the side airbag portion 42 via the upper side second communication holes 42D and the lower side second communication holes 44C to the rear chamber 48, the seat cushion airbag portion 44 inflates and causes the seat portion 14A to bulge-out toward the seat upper side (see FIG. 1).

As described above, due to the gas, that is generated at the inflator 24, flowing via the side airbag portion 42 to the seat cushion airbag portion 44, the completion of inflation of the seat cushion airbag portion 44 can be delayed. As a result, in the same way as in the first embodiment, the femoral region D of the passenger P coming-out of the range of protection of the side airbag portion 42 can be prevented or suppressed. Further, in the present embodiment, gas can be made to flow prioritarily to the side airbag portion 42 even though the diffuser 26 is not provided. Moreover, the timing at which the gas flows from the side airbag portion 42 to the seat cushion airbag portion 44, and the flow rate of the gas, can be changed merely by changing the positions and/or sizes of the upper side second communication holes 42D and the lower side second communication holes 44C. Namely, the time until expansion to the seat cushion airbag portion 44 is completed can be adjusted. Other operations are similar to those of the first embodiment.

<Third Embodiment>

A passenger protecting device 50 for a vehicle relating to a third embodiment is described next on the basis of FIGS. 8A and 8B. Note that structures that are similar to those of the first embodiment are denoted by the same reference numerals, and description thereof is omitted as appropriate.

Further, because the vehicle seat is structured similarly to the first embodiment, illustration and description thereof are omitted here.

Figure 8A:
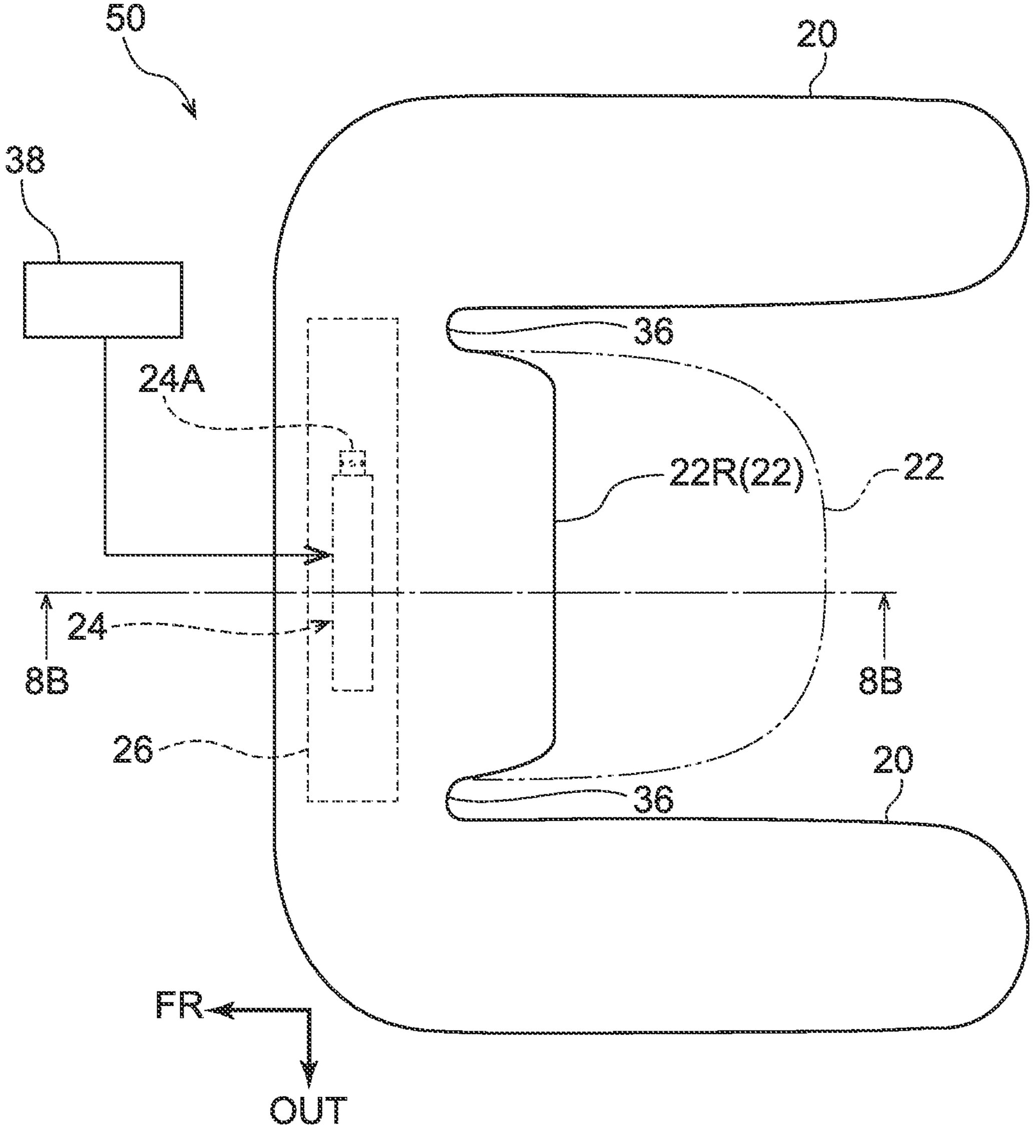
FIG. 8A is a plan sectional view showing a passenger protecting device for a vehicle relating to a third embodiment.
Figure 8B:
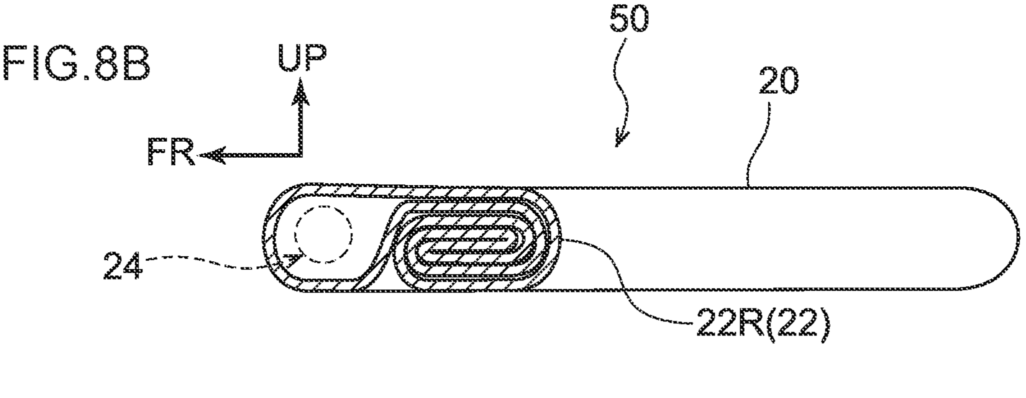
FIG. 8B is a cross-sectional view showing the state cut along line 8B-8B of FIG. 8A.

As shown in FIGS. 8A and 8B, the passenger protecting device 50 for a vehicle of the present embodiment (hereinafter simply called "passenger protecting device 50") is structured to include the pair of side airbag portions 20, the seat cushion airbag portion 22, the inflator 24 and the diffuser 26.

Here, the side airbag portions 20 are not folded, whereas the seat cushion airbag portion 22 is folded in the form of a roll in the non-inflated state. Concretely, the seat rear side portion of the seat cushion airbag portion 22 is made into a rolled portion 22R that is folded in the form of a roll.

(Operation and Effects)

Operation and effects of the present embodiment are described next.

In the passenger protecting device 50 of the present embodiment, when the vehicle is involved in an oblique side collision, the inflator 24 is operated by the ECU 38, and gas is generated. Here, due to gas being supplied to the rolled portion 22R of the seat cushion airbag portion 22, the rolled portion 22R inflates while expanding (while being unrolled). Due thereto, inflation of the seat cushion airbag portion 22 is completed later than the side airbag portions 20 that are not folded. As a result, in the same way as in the first embodiment, the femoral region D of the passenger P coming-out of the range of protection of the side airbag portions 20 can be prevented or suppressed. Further, in the present embodiment, the diffuser 26 is provided, and therefore, there is a structure in which gas from the inflator 24 flows prioritarily to the side airbag portions 20. Due thereto, the completion of inflation of the seat cushion airbag portion 22 can be delayed effectively.

Further, the time until inflation of the seat cushion airbag portion 22 is completed can be adjusted merely by increasing or reducing the number of times that the rolled portion 22R is folded. For example, if the number of times of folding is increased, the expansion time is longer, and therefore, the time until completion of inflation can be delayed more. Other operations are the same as those of the first embodiment.

Note that, in the present embodiment, as an example, the seat cushion airbag portion 22 is folded in the form of a roll, but the present invention is not limited to this, and another way of folding may be utilized. For example, the seat cushion airbag portion 22 may be folded in the form of bellows, or the like. Further, there may be a structure in which both the side airbag portions 20 and the seat cushion airbag portion 22 are folded. In this case, if the number of times that the side airbag portions 20 are folded is made to be less than the number of times that the seat cushion airbag portion 22 is folded, the completion of inflation of the seat cushion airbag portion 22 can be delayed.

<Fourth Embodiment>

A passenger protecting device 60 for a vehicle relating to a fourth embodiment is described next on the basis of FIG. 9. Note that structures that are similar to those of the first embodiment are denoted by the same reference numerals, and description thereof is omitted as appropriate. Further, because the vehicle seat is structured similarly to the first embodiment, illustration and description thereof are omitted here.

Figure 9:
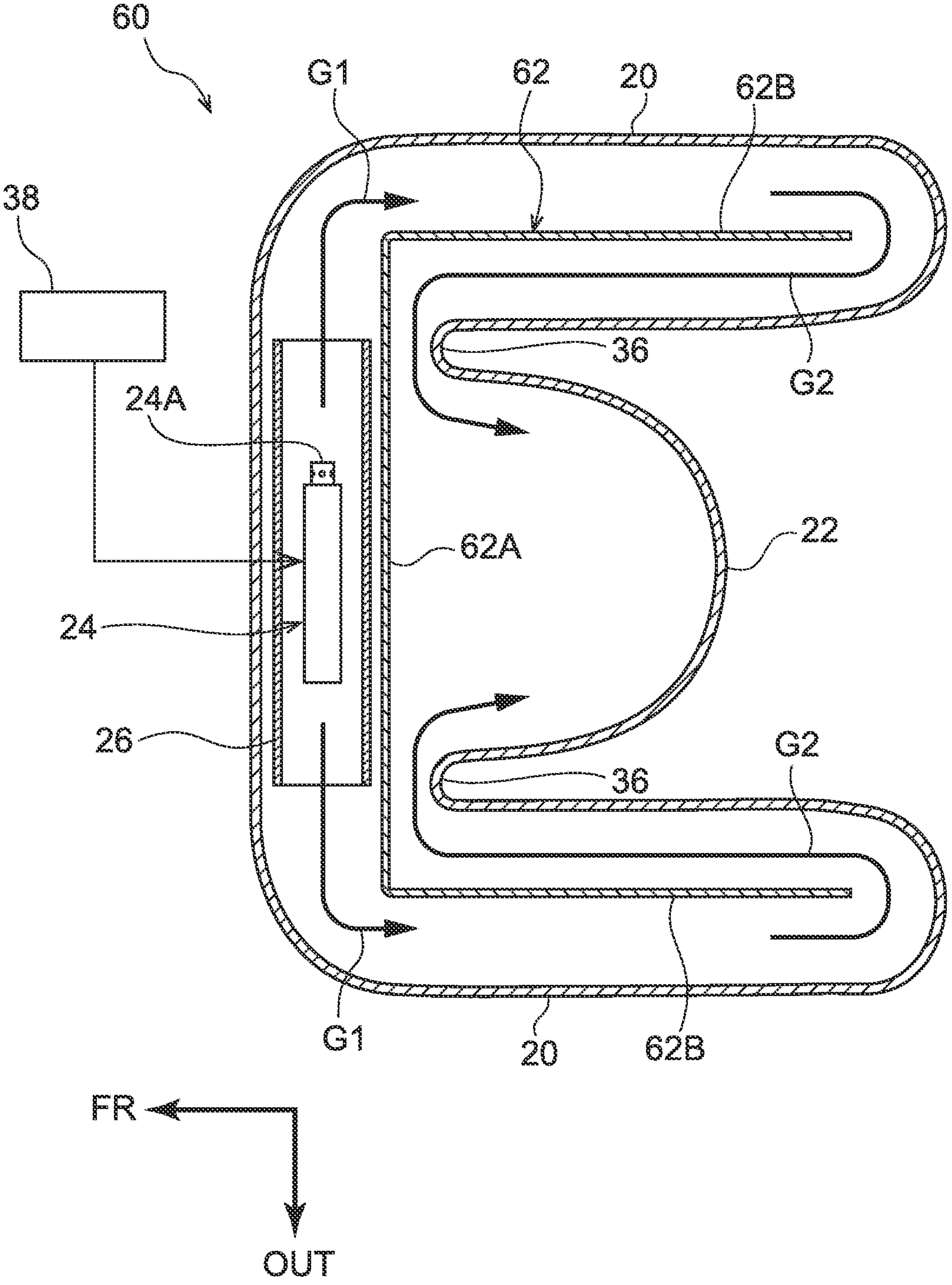
FIG. 9 is a plan sectional view of a passenger protecting device for a vehicle relating to a fourth embodiment.

As shown in FIG. 9, the passenger protecting device 60 for a vehicle of the present embodiment (hereinafter simply called "passenger protecting device 60") is structured to include the pair of side airbag portions 20, the seat cushion airbag portion 22, the inflator 24, the diffuser 26 and a tether 62.

The tether 62 is a partitioning cloth for partitioning the interiors of the side airbag portions 20 and the seat cushion airbag portion 22 and forming flow paths of the gas, and is sewn to the upper and lower base cloths respectively. Note that the length of the tether 62 in the seat vertical direction is set to be a length such that the tether 62 does not inhibit inflation of the side airbag portions 20 and the seat cushion airbag portion 22. Further, the tether 62 is structured to include a front-rear partitioning portion 62A that extends in the seat transverse direction along the diffuser 26, and left-right partitioning portions 62B that extend from the both end portions of the front-rear partitioning portion 62A toward the seat rear side.

The front-rear partitioning portion 62A is disposed at the seat rear side of the diffuser 26 with the seat longitudinal direction being the thickness direction thereof. One end portion of the front-rear partitioning portion 62A in the seat transverse direction is positioned at the seat transverse direction intermediate portion of one of the side airbag portions 20. The other end portion of the front-rear partitioning portion 62A in the seat transverse direction is positioned at the seat transverse direction intermediate portion of the other side airbag portion 20.

The left-right partitioning portions 62B are respectively disposed at the interiors of the pair of side airbag portions 20 with the seat transverse direction being the thickness directions thereof, and extend to vicinities of the rear end portions of the side airbag portions 20. Due thereto, the gas generated at the inflator 24 first flows from the diffuser 26 toward the seat transverse direction outer sides as shown by arrows G1 in the drawing, and thereafter, flows at the seat transverse direction outer sides of the side airbag portions 20 along the tether 62. Then, as shown by arrows G2, at the rear end portions of the side airbag portions 20, the gas circles-in toward the seat transverse direction inner sides of the side airbag portions 20, and flows toward the seat front side along the tether 62. Due thereto, the side airbag portions 20 are inflated. Thereafter, the seat cushion airbag portion 22 is inflated due to the gas flowing to the seat cushion airbag portion 22.

(Operation and Effects)

Operation and effects of the present embodiment are described next.

At the passenger protecting device 60 of the present embodiment, when the vehicle is involved in an oblique side collision, the inflator 24 is operated by the ECU 38, and gas is generated. Here, as described above, because gas flow paths are formed by the tether 62, the gas generated at the inflator 24 flows into the side airbag portions 20, and thereafter, flows to the seat cushion airbag portion 22. In this way, completion of inflation of the seat cushion airbag portion 22 can be delayed, and, in the same way as in the first embodiment, the femoral region D of the passenger P coming-out of the range of protection of the side airbag portions 20 can be prevented or suppressed. Other operations are similar to those of the first embodiment.

<Fifth Embodiment>

A passenger protecting device 70 for a vehicle relating to a fifth embodiment is described next on the basis of FIGS. 10 and 11. Note that structures that are similar to those of the first embodiment are denoted by the same reference numerals, and description thereof is omitted as appropriate. Further, because the vehicle seat is structured similarly to the first embodiment, illustration and description thereof are omitted here.

Figure 10:
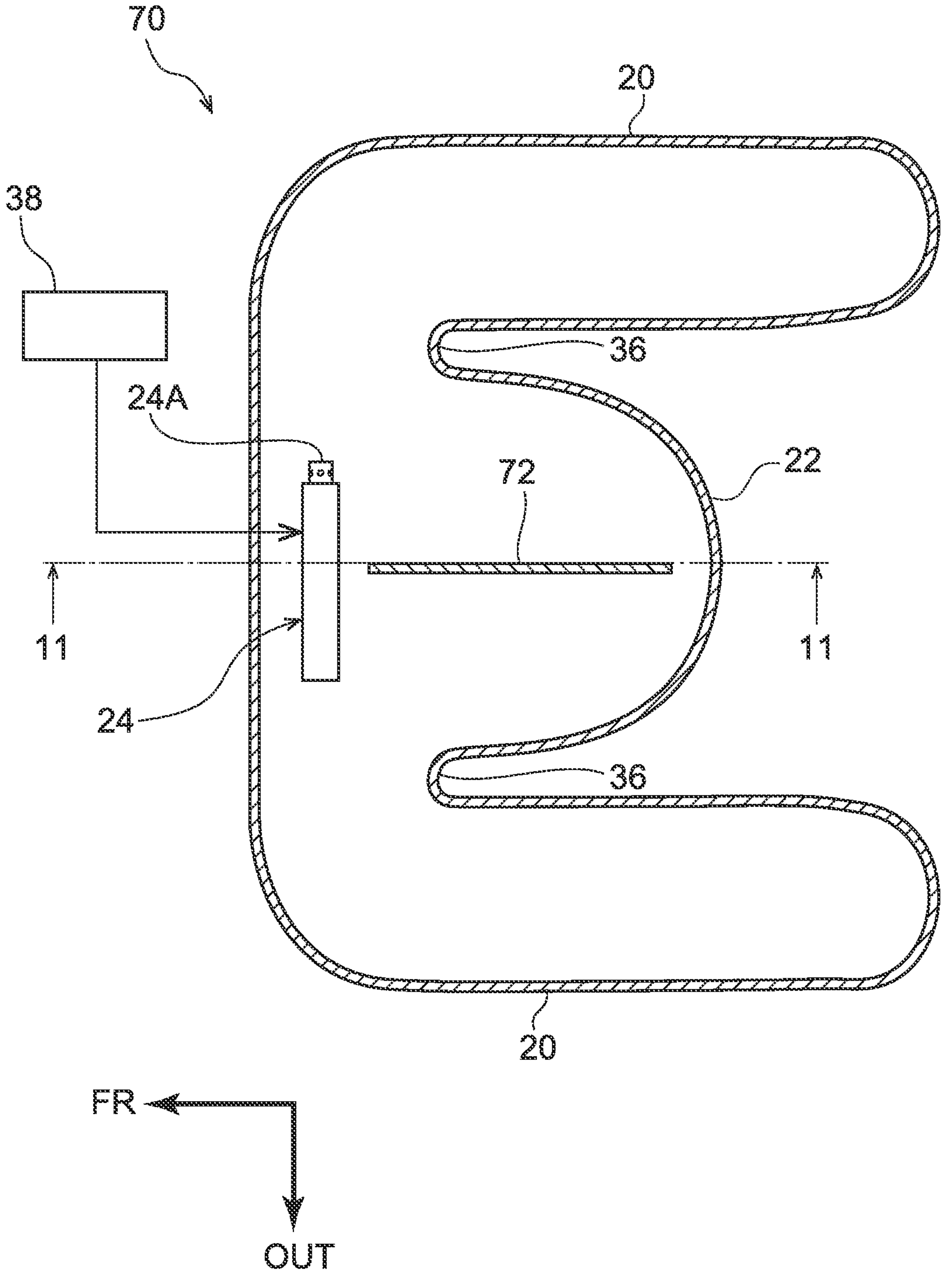
FIG. 10 is a plan sectional view of a passenger protecting device for a vehicle relating to a fifth embodiment.

As shown in FIG. 10, the passenger protecting device 70 for a vehicle of the present embodiment (hereinafter simply called "passenger protecting device 70") is structured to include the pair of side airbag portions 20, the seat cushion airbag portion 22, the inflator 24, and an intermediate cloth 72 that serves as an inflation limiting means.

Here, the intermediate cloth 72 is provided at the interior of the seat cushion airbag portion 22, and extends in the seat longitudinal direction from the rear end portion of the seat cushion airbag portion 22 to a vicinity of the inflator 24, with the seat transverse direction being the thickness direction thereof.

Figure 11A:
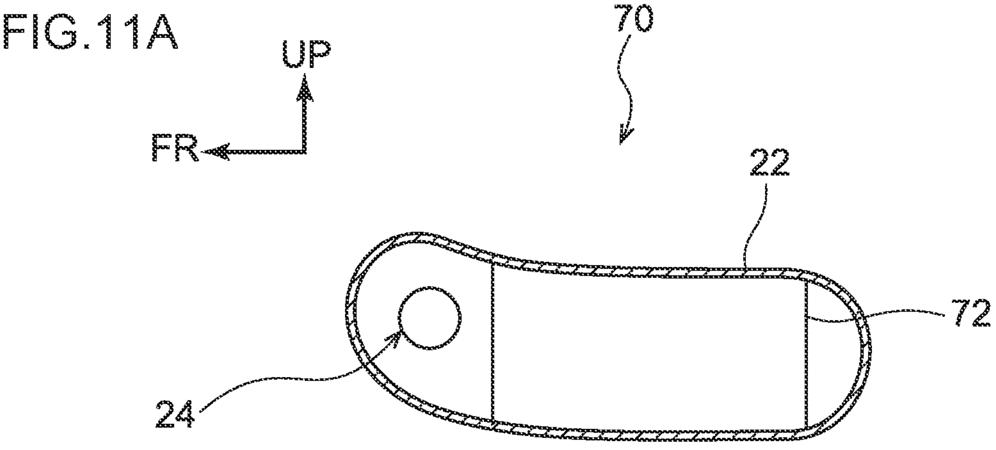
FIG. 11A is a cross-sectional view showing the state cut along line 11-11 of FIG. 10, and a state before breaking of an intermediate cloth.

Further, as shown in FIG. 11A, the upper and lower base cloths that structure the seat cushion airbag portion 22 are connected by the intermediate cloth 72. Moreover, the length, in the seat vertical direction, of the intermediate cloth 72 is formed to be shorter than the length, in the seat vertical direction, of the seat cushion airbag portion 22 at the time of completion of inflation. Namely, this is a structure in which inflation of the seat cushion airbag portion 22 is limited by the intermediate cloth 72.

Figure 11B:
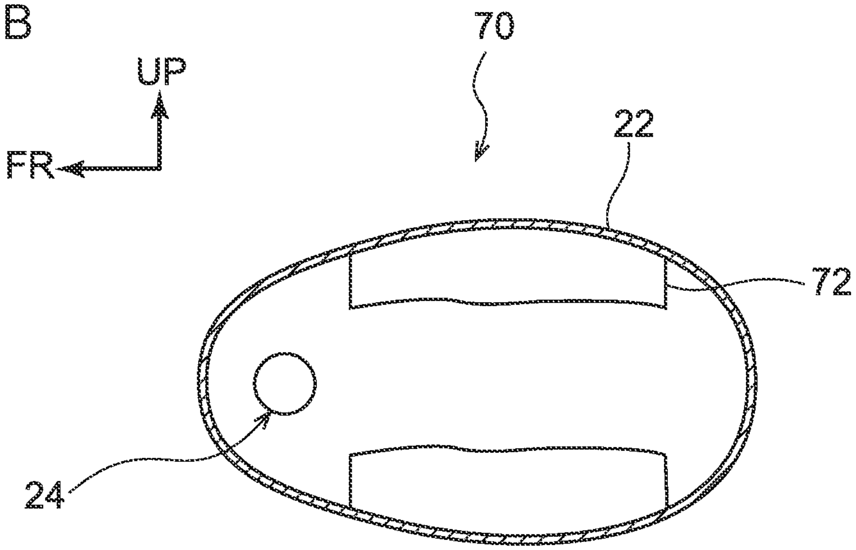
FIG. 11B is a cross-sectional view showing the state cut along line 11-11 of FIG. 10, and a state after breaking of the intermediate cloth.

The intermediate cloth 72 is formed from a material that is weaker than the base cloths that structure the side airbag portions 20 and the seat cushion airbag portion 22. Therefore, as shown in FIG. 11B, the intermediate cloth 72 breaks due to a predetermined inflation pressure being applied to the seat cushion airbag portion 22.

(Operation and Effects)

Operation and effects of the present embodiment are described next.

At the passenger protecting device 70 of the present embodiment, when the vehicle is involved in an oblique side collision, the inflator 24 is operated by the ECU 38, and gas is generated. Therefore, gas is supplied to the side airbag portions 20 and the seat cushion airbag portion 22. Here, as described above, because inflation of the seat cushion airbag portion 22 is limited by the intermediate cloth 72, inflation of the side airbag portions 20 is completed first. Thereafter, when the seat cushion airbag portion 22 reaches a predetermined inflation pressure, the intermediate cloth 72 breaks, and inflation of the seat cushion airbag portion 22 is completed. In this way, the completion of inflation of the seat cushion airbag portion 22 can be delayed, and, in the same way as in the first embodiment, the femoral region D of the passenger P coming-out of the range of protection of the side airbag portions 20 can be prevented or suppressed.

Further, in the present embodiment, the time until the intermediate cloth 72 breaks can be changed merely by changing the material and/or the thickness of the intermediate cloth 72. Namely, the time until inflation of the seat cushion airbag portion 22 is completed can be adjusted. Other operations are similar to those of the first embodiment.

Note that, in the present embodiment, the upper and lower base cloths that structure the seat cushion airbag portion 22 are connected by the intermediate cloth 72, but the present invention is not limited to this and may employ another inflation limiting means. For example, the upper and lower base cloths that structure the seat cushion airbag portion 22 may be sewn at a tear seam that is a sewn portion that is weak. In this case, the tear seam does not break until the seat cushion airbag portion 22 reaches a predetermined inflation pressure, and therefore, completion of inflation of the seat cushion airbag portion 22 can be delayed. Further, as another structure, perforations for breakage may be formed at the vehicle vertical direction intermediate portion of the intermediate cloth 72.

<Sixth Embodiment>

A passenger protecting device 80 for a vehicle relating to a sixth embodiment is described next on the basis of FIG. 12. Note that structures that are similar to those of the first embodiment are denoted by the same reference numerals, and description thereof is omitted as appropriate.

Figure 12:
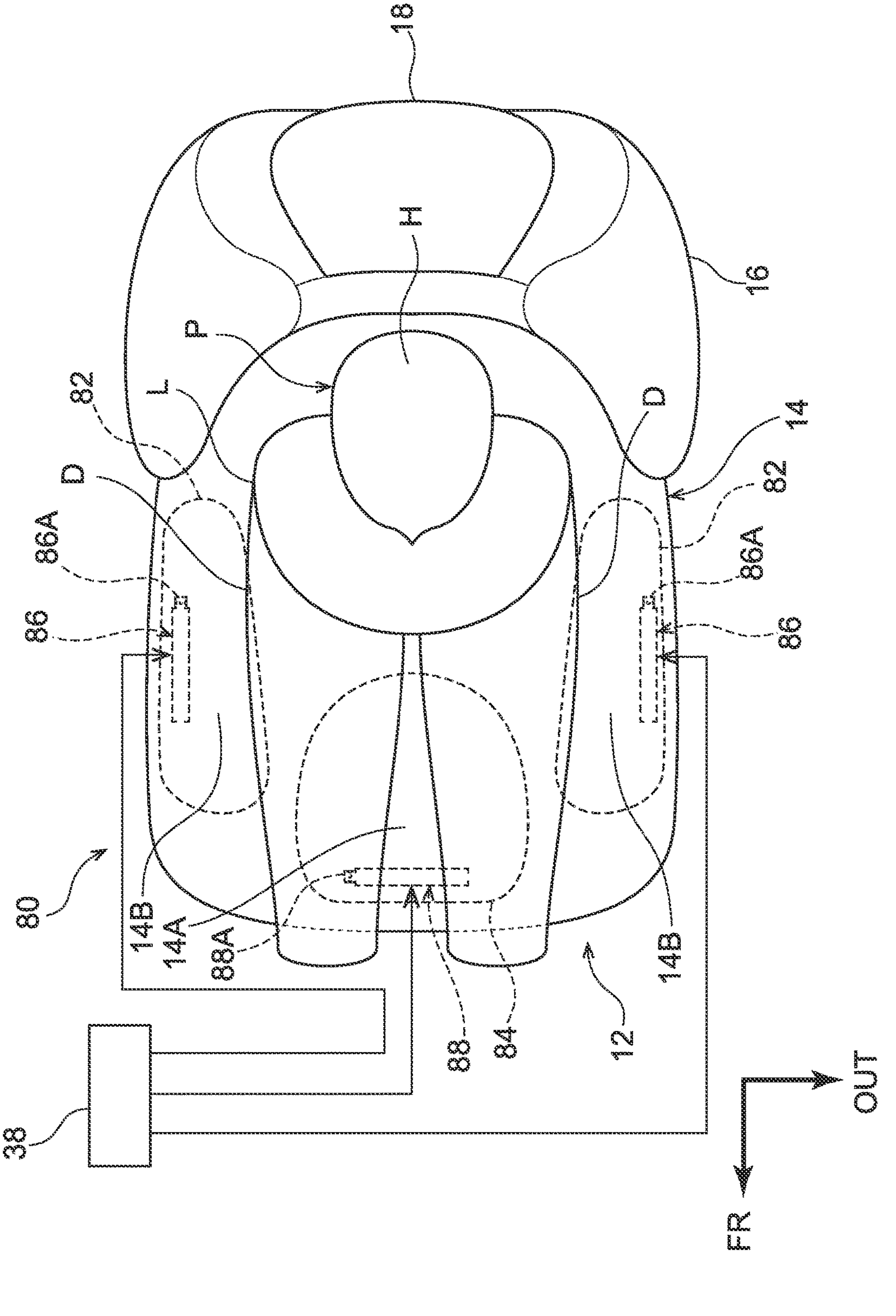
FIG. 12 is a plan view of a vehicle seat to which a passenger protecting device for a vehicle relating to a sixth embodiment is applied.

As shown in FIG. 12, the passenger protecting device 80 for a vehicle of the present embodiment (hereinafter simply called "passenger protecting device 80") is structured to include a pair of side airbag portions 82, a seat cushion airbag portion 84, and inflators 86, 88. Further, the present embodiment differs from the other embodiments with regard to the point that the side airbag portions 82 and the seat cushion airbag portion 84 do not communicate with one another.

The pair of side airbag portions 82 are accommodated in the interiors of the side support portions 14B respectively, and are structured so as to, by inflating, cause the side support portions 14B to bulge-out toward the seat upper side. Further, the side airbag portions 82 extend from the lumbar region L to the femoral region D of the passenger P. The side airbag portions 82 in their inflated states are provided so as to overlap the center of gravity GD of the femoral region D and the hip point HP as seen from the seat transverse direction (see FIG. 2). Moreover, the upper ends of the side airbag portions 82 in the inflated states are inclined along the seat portion 14A toward the seat lower side while heading from the seat front side toward the seat rear side, and the rear end portions of the side airbag portions 82 are positioned at the intersection points of the seat design and the outer shape of the lumbar region L as seen from the seat transverse direction.

Further, the inflators 86 are provided at the interiors of the pair of side airbag portions 82, respectively. The inflators 86 are disposed along the side support portions 14B of the seat cushion 14 with the seat longitudinal direction being the length directions thereof. Gas jetting portions 86A are provided at length direction one end portions of the inflators 86.

The seat cushion airbag portion 84 is accommodated at the interior of the seat portion 14A of the seat cushion 14. The seat cushion airbag portion 84 is accommodated at the seat lower side of the femoral region D of the passenger P, and is structured so as to, by inflating, cause the seat portion 14A to bulge-out toward the seat upper side, and raises the femoral region D. Further, the inflator 88 is provided at the interior of the seat cushion airbag portion 84. The inflator 88 is disposed within the front end portion of the seat cushion airbag portion 84 such that the seat transverse direction is the length direction thereof. A gas jetting portion 88A is provided at a length direction one end portion of the inflator 88.

Here, the pair of inflators 86 and the inflator 88 are electrically connected to the ECU 38. When the vehicle is involved in an oblique side collision, the pair of inflators 86 are operated by the ECU 38, and gas is generated. Further, this is a structure in which the pair of inflators 86 are operated, and thereafter, after a predetermined time elapses, the inflator 88 is operated.

(Operation and Effects)

Operation and effects of the present embodiment are described next.

At the passenger protecting device 80 of the present embodiment, due to the ECU 38 causing the operational timing of the inflator 88 to be later than the operational timing of the inflators 86, inflation of the seat cushion airbag portion 84 can be completed later. As a result, in the same way as in the first embodiment, the femoral region D of the passenger P coming-out of the range of protection of the side airbag portions 82 can be prevented or suppressed.

Further, in the present embodiment, the pair of side airbag portions 82 and the seat cushion airbag portion 84 do not communicate with one another, and are structured as independent modules. Due thereto, for example, at the time of a front collision, it is possible to inflate only the seat cushion airbag portion 84. Further, at the time of a side collision, it is possible to inflate only the side airbag portions 82. Namely, it is possible to inflate only the airbag(s) that is needed in accordance with the form of the collision.

Although a first embodiment through a sixth embodiment of the present invention have been described above, these embodiments may be used by being combined appropriately, and the present invention can, of course, be embodied in various forms within a scope that does not depart from the gist thereof. For example, in the above-described embodiment, the side airbag portion 42 is accommodated in the side support portions 14B at the seat transverse direction both sides of the seat portion 14A. However, the present invention is not limited to this, and may be structured such that the side airbag portion 42 is accommodated in only the side support portion 14B at one side. In this case, from the standpoint of protecting the femoral region D and the lumbar region L of the passenger P from a collision body or the like at the time of an oblique side collision of the vehicle, it is preferable that the side airbag portion 42 be accommodated within the side support portion 14B that is positioned at the vehicle transverse direction outer side.

Further, in the above-described embodiments, the gas jetting portion 24A is provided at a length direction one end portion of the inflator 24, but the present invention is not limited to this. For example, there may be a structure in which the gas jetting portions 24A are formed at the length direction both end portions of the inflator 24. In this case, gas can be supplied substantially uniformly to the left and right side airbag portions 20, as compared with a structure in which the gas jetting portion 24A is provided at only a length direction one end portion of the inflator 24.

Moreover, although the above-described embodiments are structured such that the side airbag portions 20 and the seat cushion airbag portion 22 communicate with one another at the front end portion of the seat cushion 14, the present invention is not limited to this. For example, there may be a structure in which the side airbags and the seat cushion airbag communicate with one another at the rear end portion of the seat cushion 14. In this case, the seat cushion airbag is formed so as to extend from the lumbar region L of the passenger P and over the femoral region D, but it suffices for there to be a structure in which only the region at the lower side of the femoral region D is inflated by setting a non-inflating portion such as a seam or the like at the lower side of the lumbar region L of the passenger P, or the like.

Further, although the above-described embodiments are structured such that the inflator 24 is disposed at the front end portion of the seat cushion 14, the present invention is not limited to this, and the inflator 24 may be disposed at another portion. Moreover, the inflator 24 may be disposed at the exterior of the side airbag portions 20 and the seat cushion airbag portion 22. In this case, gas can be supplied if the inflator 24 and the side airbag portions 20 or the seat cushion airbag portion 22 are connected by tubes or the like.

Further, in the above-described embodiments (the first embodiment, the third embodiment and the fourth embodiment in particular), the diffuser 26 is provided at the outer side of the inflator 24, but the present invention is not limited to this. Namely, there may be a structure in which the diffuser 26 is not provided, provided that there is a structure in which gas can be made to flow prioritarily to the side airbag portions 20.

Moreover, the invention relating to the third embodiment or the fifth embodiment may be applied to a structure in which the side airbag portion 82 and the seat cushion airbag portion 84 do not communicate with one another as in the sixth embodiment. For example, there may be a structure in which the seat rear side portion of the seat cushion airbag portion 84 shown in FIG. 12 is folded in the form of a roll. Further, the intermediate cloth 72 that serves as an inflation limiting means may be provided at the seat cushion airbag portion 84. By employing these structures, inflation of the seat cushion airbag portion 84 can be completed later than the side airbag portions 82, even in a case in which the pair of inflators 86 and the inflator 88 are operated simultaneously by the ECU 38.

What is claimed is:

1. A passenger protecting device for a vehicle, comprising:

a side airbag portion that is accommodated at an interior of a side support portion that protrudes toward a seat upper side from a seat transverse direction outer side with respect to a seat portion of a seat cushion at a vehicle seat, and that, by receiving a supply of gas and inflating at a time of a side collision including an oblique side collision of a vehicle, causes the side support portion to bulge toward the seat upper side, and protects a femoral region and a lumbar region of a passenger from the seat transverse direction outer side; and a seat cushion airbag portion that is accommodated at an interior of the seat portion, and that, by receiving a supply of gas and inflating at a time of a front collision including an oblique side collision of the vehicle, causes the seat portion to bulge toward the seat upper side and raises the femoral region of the passenger, inflation of the seat cushion airbag portion being completed later than that of the side airbag portion, wherein the passenger is an AM50 World SID dummy, and wherein at least one of the following (A) and (B) applies:

A) an upper portion of the side airbag portion is, in an inflated state, disposed further to an upper side in the seat vertical direction than an upper surface of the seat portion, B) the side airbag portion is, in an inflated state, provided at a position that overlaps a center of gravity of the femoral region and a hip point of the passenger as seen from a seat transverse direction.

2. The passenger protecting device for a vehicle of claim 1, wherein:

the side airbag portion and the seat cushion airbag portion are in communication with each other, an inflator, that supplies gas to the side airbag portion and to the seat cushion airbag portion, is provided at an interior of the seat cushion, and inflation of the side airbag portion by gas generated from the inflator is prioritized.

3. The passenger protecting device for a vehicle of claim 2, wherein:

a recessed portion that is hollowed out toward a seat front side is formed between the side airbag portion and the seat cushion airbag portion, and the side airbag portion and the seat cushion airbag portion are communicated with each other at a front end portion at a seat front side at the seat cushion.

4. The passenger protecting device for a vehicle of claim 2, further comprising a flow regulating cloth, that guides gas generated from the inflator to the side airbag portion.

5. The passenger protecting device for a vehicle of claim 2, wherein:

the side airbag portion and the seat cushion airbag portion are configured by separate base cloths, and are communicated with each other via communication holes, and a gas flow path is formed such that gas generated from the inflator flows from the side airbag portion via the communication holes to the seat cushion airbag portion.

6. The passenger protecting device for a vehicle of claim 5, wherein:

an internal space of the seat cushion airbag portion is partitioned by a tether into a front chamber at a seat front side and a rear chamber at a seat rear side, the communication holes comprise a first communication hole that communicates the front chamber and the side airbag portion, and a second communication hole that communicates the rear chamber and the side airbag portion, and the inflator is disposed at the front chamber.

7. The passenger protecting device for a vehicle of claim 1, wherein:

the seat cushion airbag portion is accommodated at the interior of the seat portion in a folded-up state, and the side airbag portion is accommodated at the interior of the side support portion in a state of being deployed without being folded.

8. The passenger protecting device for a vehicle of claim 1, wherein:

the seat cushion airbag portion is accommodated at the interior of the seat portion in a folded-up state, and the side airbag portion is accommodated at the interior of the side support portion in a state of being folded a number of times that is less than a number of times that the seat cushion airbag portion is folded.

9. The passenger protecting device for a vehicle of claim 1, wherein:

the seat cushion airbag portion has an inflation limiting member that breaks at a predetermined inflation pressure, and a base cloth that configures the seat cushion airbag portion is connected in a seat vertical direction by the inflation limiting means.

10. The passenger protecting device for a vehicle of claim 1, wherein:

the side airbag portion is, in an inflated state, provided at a position that overlaps a center of gravity of the femoral region and a hip point of the passenger as seen from a seat transverse direction, and an upper end of the side airbag portion in the inflated state is inclined along the seat portion toward a seat lower side from a seat front side toward a seat rear side.

11. The passenger protecting device for a vehicle of claim 1, wherein at least (A) applies.

12. The passenger protecting device for a vehicle of claim 1, wherein at least (B) applies.

* * * * *